United States Patent
Ji et al.

(10) Patent No.: US 10,117,246 B2
(45) Date of Patent: Oct. 30, 2018

(54) TECHNIQUES FOR IDENTIFYING SECONDARY SERVING CELLS OPERATING IN SHARED ACCESS RADIO FREQUENCY SPECTRUM

(71) Applicant: QUALCOMM Incorporated, San Diego, CA (US)

(72) Inventors: Tingfang Ji, San Diego, CA (US); Peter Gaal, San Diego, CA (US); Yongbin Wei, San Diego, CA (US); Hao Xu, San Diego, CA (US); Wanshi Chen, San Diego, CA (US); Tao Luo, San Diego, CA (US); Durga Prasad Malladi, San Diego, CA (US); Naga Bhushan, San Diego, CA (US); Aleksandar Damnjanovic, Del Mar, CA (US); Shimman Arvind Patel, San Diego, CA (US)

(73) Assignee: QULACOMM Incorporated, San Diego, CA (US)

( * ) Notice: Subject to any disclaimer, the term of this patent is extended or adjusted under 35 U.S.C. 154(b) by 551 days.

(21) Appl. No.: 14/529,997

(22) Filed: Oct. 31, 2014

(65) Prior Publication Data
US 2015/0208414 A1    Jul. 23, 2015

Related U.S. Application Data

(60) Provisional application No. 61/929,479, filed on Jan. 20, 2014.

(51) Int. Cl.
*H04W 36/00*       (2009.01)
*H04W 48/20*       (2009.01)
(Continued)

(52) U.S. Cl.
CPC ... *H04W 72/0453* (2013.01); *H04W 36/0072* (2013.01); *H04W 48/20* (2013.01); *H04W 88/10* (2013.01)

(58) Field of Classification Search
CPC ......... H04W 72/0453; H04W 36/0072; H04W 88/10
See application file for complete search history.

(56) References Cited

U.S. PATENT DOCUMENTS 9,419,759 B2 *   8/2016   Choi ................... H04W 56/00
2012/0250578 A1  10/2012  Pani et al.
(Continued)

FOREIGN PATENT DOCUMENTS

EP   2352324 A1   8/2011
EP   2663148 A1   11/2013

OTHER PUBLICATIONS

ISA/EPO, International Search Report and Written Opinion of the International Searching Authority, Int'l App. No. PCT/US2015/010966, dated Mar. 19, 2015, European Patent Office, Rijswijk, NL 13 pgs.

*Primary Examiner* — Muthuswamy Manoharan
(74) *Attorney, Agent, or Firm* — Dalei Dong; Holland & Hart

(57) ABSTRACT

Techniques are described for wireless communication. One method includes determining that a cell operates in a shared access radio frequency spectrum, and transmitting signaling information to a mobile device indicating that the cell is prohibited from serving as a primary serving cell based at least in part on the determination that the cell operates in the shared access radio frequency spectrum. Another method includes receiving signaling information at a mobile device from a base station indicating that a cell operating in a shared access radio frequency spectrum is prohibited from serving as a primary serving cell, and identifying the cell as (Continued)

prohibited from serving as a primary serving cell based at least in part on the received signaling information. Another method includes identifying, by a mobile device, a cell operating in a shared access radio frequency spectrum as a secondary serving cell based at least in part on information stored on the mobile device.

29 Claims, 25 Drawing Sheets

(51) Int. Cl.
    *H04W 72/04*     (2009.01)
    *H04W 88/10*     (2009.01)

(56) References Cited

U.S. PATENT DOCUMENTS

| | | | |
|---|---|---|---|
| 2012/0307744 A1 | 12/2012 | Charbit et al. | |
| 2013/0217402 A1* | 8/2013 | Lin | H04W 72/12 455/450 |
| 2013/0244656 A1* | 9/2013 | Heo | H04W 72/0413 455/436 |
| 2013/0288694 A1* | 10/2013 | Mochizuki | H04W 72/04 455/450 |
| 2014/0192703 A1* | 7/2014 | Chun | H04W 76/002 370/312 |
| 2015/0215825 A1* | 7/2015 | Kim | H04W 36/0088 370/331 |
| 2016/0316508 A1* | 10/2016 | Hong | H04W 76/025 |

* cited by examiner

2400

Identifying, by a mobile device, a cell operating in a shared access radio frequency spectrum is prohibited from serving as a primary serving cell based at least in part on information stored on the mobile device — 2405

TECHNIQUES FOR IDENTIFYING SECONDARY SERVING CELLS OPERATING IN SHARED ACCESS RADIO FREQUENCY SPECTRUM

CROSS REFERENCES

The present application for patent claims priority to U.S. Provisional Patent Application No. 61/929,479 by Ji et al., entitled "Techniques for Identifying Secondary Serving Cells Operating in Shared Access Radio Frequency Spectrum," filed Jan. 20, 2014, assigned to the assignee hereof, and which is hereby incorporated by reference in its entirety.

FIELD OF THE DISCLOSURE

The present disclosure, for example, relates to wireless communication systems, and more particularly to techniques for identifying secondary serving cells operating in shared access radio frequency spectrum.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

For example, a wireless multiple-access communication system may include a number of base stations, each simultaneously supporting communication for multiple mobile devices. A base station may communicate with mobile devices on downlink channels (e.g., for transmissions from a base station to a mobile device) and uplink channels (e.g., for transmissions from a mobile device to a base station).

Some modes of communication with a mobile device may enable communication with the mobile device over different radio frequency spectrum (e.g., licensed radio frequency spectrum and/or shared access radio frequency spectrum). Some modes of communication with a mobile device may also enable communication with the mobile device via a primary serving cell (e.g., a first frequency component carrier) and, optionally, one or more secondary serving cells (e.g., second or third frequency component carriers). Under some conditions, different serving cells may communicate with the mobile device over different radio frequency spectrum.

SUMMARY

The present disclosure, for example, relates to one or more techniques for identifying secondary serving cells operating in a shared access radio frequency spectrum. In some examples, certain frequencies and/or serving cells may be less reliable for handling control signals (e.g., due to the radio frequency used, interference, backhaul conditions, etc.). In some examples, frequencies of a shared access radio frequency spectrum (e.g., a radio frequency spectrum for which apparatuses may need to contend for access because the radio frequency spectrum is available to unlicensed use, such as a Wi-Fi radio frequency spectrum, and/or radio frequency spectrum which a plurality of mobile network operators (MNOs) are authorized to access) and/or cells communicating over such a shared access radio frequency spectrum may be less reliable for handling control signals. Thus, it may be useful to indicate that such frequencies may not be used by a mobile device to select a primary serving cell (or that such frequencies may be used to select one or more secondary serving cells) or that such cells are prohibited from serving as primary cells (or that such cells may operate as secondary serving cells).

In a first set of illustrative examples, a first method for wireless communication is described. In one example, the method may include determining that a cell operates in a shared access radio frequency spectrum, and transmitting signaling information to a mobile device indicating that the cell is prohibited from serving as a primary serving cell based at least in part on the determination that the cell operates in the shared access radio frequency spectrum.

In some examples of the method, transmitting the signaling information may include transmitting the signaling information using dedicated signaling resources. In these examples, the signaling information may include radio resource control (RRC) signaling information. Also, the signaling information may indicate one or more frequencies of the shared access radio frequency spectrum that the mobile device should not monitor when the mobile device is in an RRC idle state.

In some examples of the method, one or more frequencies of the shared access radio frequency spectrum may not be assigned a cell reselection priority.

In some examples of the method, transmitting the signaling information may include broadcasting the signaling information. In the same or other examples, the signaling information may indicate that the mobile device is prohibited from accessing the cell as a primary serving cell for a time period.

In some examples, the method may include determining one or more frequency ranges of the shared access radio frequency spectrum are not suitable for selection of a primary serving cell. The one or more frequency ranges may include a frequency used by the cell. In these examples, at least a portion of the signaling information may include one or more frequency band identifiers or channel identifiers that uniquely identify the one or more frequency ranges of the shared access radio frequency spectrum.

In some examples, the method may include determining a frequency range of the shared access radio frequency spectrum is not suitable for selection of a primary serving cell. The frequency range may include a frequency used by the cell. In these examples, at least a portion of the signaling information may include one of a plurality of frequency band identifiers or channel identifiers that identify the frequency range of the shared access radio frequency spectrum.

In some examples of the method, transmitting the signaling information may include transmitting the signaling information using a primary synchronization signal (PSS), a secondary synchronization signal (SSS), or a cell reference signal (CRS). In other examples, transmitting the signaling information may include transmitting the signaling information using a clear channel assessment (CCA) exempt transmission (CET) frame.

In some examples of the method, the signaling information may be transmitted in a master information block (MIB). In some examples, the signaling information may be transmitted using one or more information elements added to the MIB. In some examples, the signaling information may be transmitted in a system information block (SIB). In some examples, the signaling information may be transmitted using one or more information elements added to the SIB. In some examples, a frequency band identifier may be used to indicate that the cell is prohibited from serving as a primary serving cell.

In some examples, the method may include preventing a handover of the mobile device to the cell based at least in part on the determination that the cell operates in the shared access radio frequency spectrum when the mobile device is in an RRC connected state. In the same or other examples, the signaling information may indicate one or more frequencies of the shared access radio frequency spectrum that are unavailable for cell reselection consideration when the mobile device is in an RRC idle state.

In some examples, the method may include receiving a request from the mobile device to access the cell that operates in the shared access radio frequency spectrum, and rejecting the request to access the cell that operates in the shared access radio frequency spectrum. In these examples, transmitting the signaling information may include transmitting a cause value to the mobile device indicating that the cell is prohibited from serving as the primary serving cell.

In a second set of illustrative examples, an apparatus for wireless communication is described. In one example, the apparatus may include means for determining that a cell operates in a shared access radio frequency spectrum. The apparatus may also include means for transmitting signaling information to a mobile device indicating that the cell is prohibited from serving as a primary serving cell based at least in part on the determination that the cell operates in the shared access radio frequency spectrum. In certain examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to determine that a cell operates in a shared access radio frequency spectrum, and to transmit signaling information to a mobile device indicating that the cell is prohibited from serving as a primary serving cell based at least in part on the determination that the cell operates in the shared access radio frequency spectrum. In certain examples, the instructions may also be executable by the processor to implement one or more aspects of the method for wireless communication described above with respect to the first set of illustrative examples.

In a fourth set of illustrative examples, a computer program product for communication by a wireless communication apparatus in a wireless communication system is described. In one example, the computer program product may include a non-transitory computer-readable medium storing instructions executable by a processor to cause the wireless communication apparatus to determine that a cell operates in a shared access radio frequency spectrum, and to transmit signaling information to a mobile device indicating that the cell is prohibited from serving as a primary serving cell based at least in part on the determination that the cell operates in the shared access radio frequency spectrum. In certain examples, the instructions may also be executable by the processor to cause the wireless communication apparatus to implement one or more aspects of the method for wireless communication described above with respect to the first set of illustrative examples.

In a second set of illustrative examples, a second method for wireless communication is described. In one example, the method may include receiving signaling information at a mobile device from a base station indicating that a cell operating in a shared access radio frequency spectrum is prohibited from serving as a primary serving cell, and the mobile device identifying the cell as prohibited from serving as a primary serving cell based at least in part on the received signaling information.

In some examples of the method, the signaling information may be received via dedicated signaling resources. In the same or other examples of the method, the signaling information may be received via RRC signaling. Also, the signaling information may indicate one or more frequencies of the shared access radio frequency spectrum that the mobile device should not monitor when the mobile device is in an RRC idle state.

In some examples of the method, the signaling information may indicate that the mobile device is prohibited from accessing the cell as a primary serving cell for a time period.

In some examples of the method, at least a portion of the signaling information may include one or more frequency band identifiers or channel identifiers that uniquely identify one or more frequency ranges of the shared access radio frequency spectrum. The one or more frequency ranges may include a frequency used by the cell. In these examples, the method may include determining the one or more frequency ranges of the shared access radio frequency spectrum are not suitable for selection of a primary serving cell.

In some examples of the method, at least a portion of the signaling information may include one of a plurality of frequency band identifiers or channel identifiers that identify a frequency range of the shared access radio frequency spectrum. The frequency range may include a frequency used by the cell. In these examples, the method may include determining the frequency range of the shared access radio frequency spectrum is not suitable for selection of a primary serving cell.

In some examples of the method, the signaling information may indicate one or more frequencies of the shared access radio frequency spectrum that are unavailable for cell reselection consideration when the mobile device is in an RRC idle state.

In a sixth set of illustrative examples, another apparatus for wireless communication is described. In one example, the apparatus may include means for receiving signaling information at a mobile device from a base station indicating that a cell operating in a shared access radio frequency spectrum is prohibited from serving as a primary serving cell. The apparatus may also include means for identifying the cell as prohibited from serving as the primary serving cell based at least in part on the received signaling information. In certain examples, the apparatus may further include means for implementing one or more aspects of the method for wireless communication described above with respect to the fifth set of illustrative examples.

In a seventh set of illustrative examples, another apparatus for wireless communication is described. In one example, the apparatus may include a processor, memory in electronic communication with the processor, and instructions stored in the memory. The instructions may be executable by the processor to receive signaling information at a mobile device from a base station indicating that a cell operating in a shared access radio frequency spectrum is prohibited from serving as a primary serving cell. The instructions may also be executable by the processor to identify the cell as prohibited form serving as a primary serving cell based at least in part on the received signaling information. In certain examples, the instructions may also be executable by the processor to implement one or more aspects of the method for wireless communication described above with respect to the fifth set of illustrative examples.

In an eighth set of illustrative examples, another computer program product for communication by a wireless communication apparatus in a wireless communication system is described. In one example, the computer program product may include a non-transitory computer-readable medium storing instructions executable by a processor to cause the wireless communication apparatus to receive signaling information at a mobile device from a base station indicating that a cell operating in a shared access radio frequency spectrum is prohibited from serving as a primary serving cell. The instructions may also be executable by the processor to cause the wireless communication apparatus to identify the cell as prohibited from serving as a primary serving cell based at least in part on the received signaling information. In certain examples, the instructions may also be executable by the processor to cause the wireless communication apparatus to implement one or more aspects of the method for wireless communication described above with respect to the fifth set of illustrative examples.

In a ninth set of illustrative examples, a third method for wireless communication is described. In one example, the method may include identifying, by a mobile device, a cell operating in a shared access radio frequency spectrum as prohibited from serving as a primary cell based at least in part on information stored on the mobile device.

In a tenth set of illustrative examples, an apparatus for wireless communication is described. In one example, the apparatus may include means for identifying, by a mobile device, a cell operating in a shared access radio frequency spectrum as prohibited from serving as a primary serving cell based at least in part on information stored on the mobile device.

In an eleventh set of illustrative examples, another apparatus for wireless communication is described. In one example, the method may include a processor, memory in electronic communication with the processor, and instructions stored in the memory. The instructions may be executable by the processor to identify, by a mobile device, a cell operating in a shared access radio frequency spectrum as prohibited from serving as a primary serving cell based at least in part on information stored on the mobile device.

In a twelfth set of illustrative examples, a computer program product for communication by a wireless communication apparatus in a wireless communication system is described. In one example, the computer program product may include a non-transitory computer-readable medium storing instructions executable by a processor to cause the wireless communication apparatus to identify, by a mobile device, a cell operating in a shared access radio frequency spectrum as prohibited from serving as a primary serving cell based at least in part on information stored on the mobile device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 24 is a flow chart illustrating an example of a method for wireless communication (e.g., by a mobile device), in accordance with various aspects of the present disclosure.

DETAILED DESCRIPTION

Figure 1:
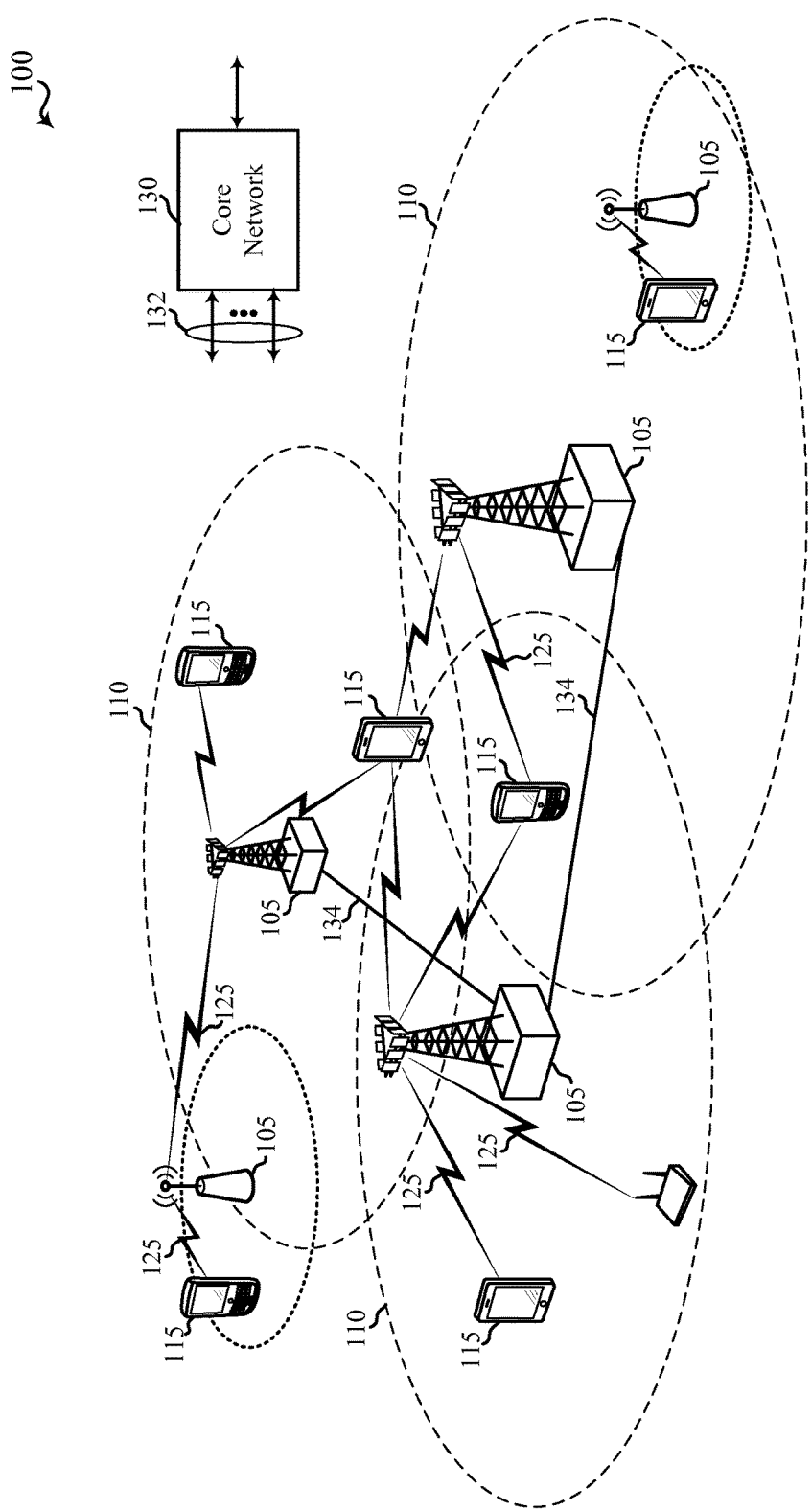
FIG. 1 shows a block diagram of a wireless communication system, in accordance with various aspects of the present disclosure.

Techniques are described for identifying secondary serving cells operating in a shared access radio frequency spectrum. In some examples, certain frequencies and/or serving cells may be less reliable for handling control signals (e.g., due to the radio frequency used, interference, backhaul conditions, etc.). In some examples, frequencies of a shared access radio frequency spectrum (e.g., a radio frequency spectrum for which apparatuses may need to contend for access because the radio frequency spectrum is available to unlicensed use, such as a Wi-Fi radio frequency spectrum, and/or radio frequency spectrum which a plurality of MNOs are authorized to access) and/or cells communicating over such a shared access radio frequency spectrum may be less reliable for handling control signals. Thus, it may be useful to indicate that such frequencies may not be used by a mobile device to select a primary serving cell (or that such frequencies may be used to select one or more secondary serving cells) or that such cells are prohibited from serving as primary cells (or that such cells may operate as secondary serving cells).

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or example set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a block diagram of a wireless communication system 100, in accordance with various aspects of the present disclosure. The wireless communication system 100 may include a plurality of base stations 105 (e.g., eNBs), a number of mobile devices 115 (e.g., user equipments (UEs)), and a core network 130. Some of the base stations 105 may communicate with the mobile devices 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the mobile devices 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area (not shown). The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum (e.g., a radio frequency spectrum for which apparatuses do not contend for access because the spectrum is licensed to particular users for particular uses) and/or a shared access radio frequency spectrum (e.g., a radio frequency spectrum for which apparatuses contend for access because the radio frequency spectrum is available to unlicensed use, such as Wi-Fi radio frequency spectrum, and/or radio frequency spectrum which a plurality of MNOs are authorized to access). In other examples, the wireless communication system 100 may support wireless communication using one or more access technologies different from LTE/LTE-A. In LTE/LTE-A communication systems, the term evolved NodeB or eNB may be, for example, used to describe the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The mobile devices 115 may be dispersed throughout the wireless communication system 100. A mobile device 115 may also be referred to by those skilled in the art as a user equipment (UE), a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A mobile device 115 may be able to communicate with macro eNBs, pico eNBs, femto eNBs, relays, and the like. A mobile device 115 may also be able to communicate over different types of access networks, such as cellular or other WWAN access networks, or WLAN access networks. In some modes of communication with a mobile device 115, communication may be conducted over a plurality of communication links 125 or channels (i.e., component carriers), with each channel using a component carrier between the mobile device and one of a number of cells (e.g., serving cells, which in some cases may be different base stations 105).

Each component carrier may be used over licensed radio frequency spectrum or shared access radio frequency spectrum, and a set of component carriers used in a particular mode of communication may all be received (e.g., at a mobile device 115) over licensed radio frequency spectrum, all be received (e.g., at a mobile device 115) over shared access radio frequency spectrum, or be received (e.g., at a mobile device 115) over a combination of licensed radio frequency spectrum and shared access radio frequency spectrum.

The communication links 125 shown in wireless communication system 100 may include uplink channels (using component carriers) for carrying uplink (UL) communications (e.g., transmissions from a mobile device 115 to a base station 105) and/or downlink channels (using component carriers) for carrying downlink (DL) communications (e.g., transmissions from a base station 105 to a mobile device 115). The UL communications or transmissions may also be called reverse link communications or transmissions, while the DL communications or transmissions may also be called forward link communications or transmissions. The downlink communications and/or uplink communications may be made using licensed radio frequency spectrum, shared access radio frequency spectrum, or both.

In some examples of the wireless communication system 100, LTE/LTE-A may be deployed under different scenarios using shared access radio frequency spectrum. The deployment scenarios may include a supplemental downlink mode in which LTE/LTE-A downlink communications in a licensed radio frequency spectrum may be offloaded to a shared access radio frequency spectrum, a carrier aggregation mode in which both LTE/LTE-A downlink and uplink communications may be offloaded from a licensed radio frequency spectrum to a shared access radio frequency spectrum, and a standalone mode in which LTE/LTE-A downlink and uplink communications between a base station and a mobile device may take place in a shared access radio frequency spectrum. Base stations 105 as well as mobile devices 115 may support one or more of these or similar modes of operation. OFDMA waveforms may be used in the communication links 125 for LTE/LTE-A downlink communications in licensed radio frequency spectrum and/or shared access radio frequency spectrum, while OFDMA, SC-FDMA and/or resource block interleaved FDMA waveforms may be used in the communication links 125 for LTE/LTE-A uplink communications in a licensed radio frequency spectrum and/or shared access radio frequency spectrum.

Figure 2:
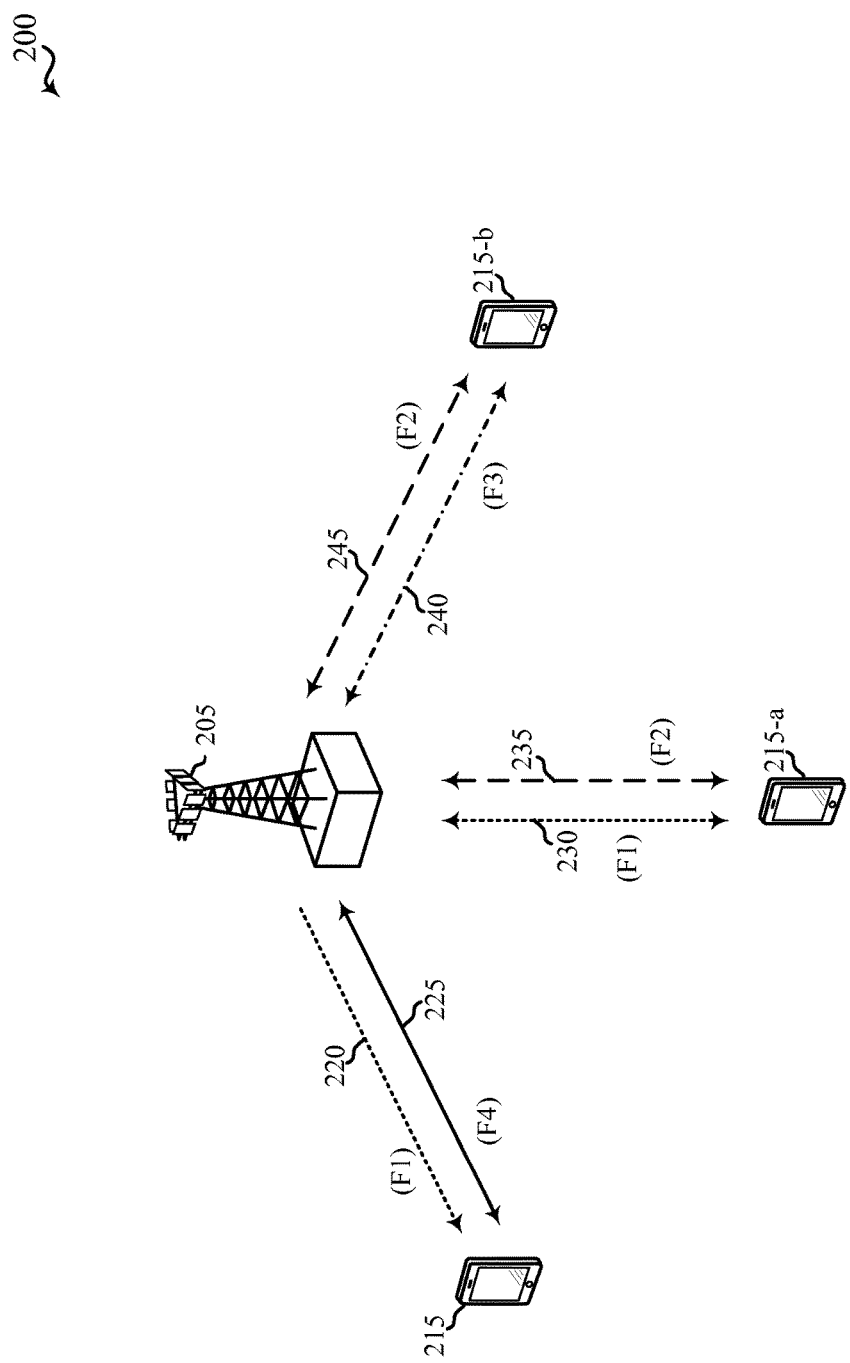
FIG. 2 shows a wireless communication system in which LTE/LTE-A is deployed under different scenarios using shared access radio frequency spectrum, in accordance with various aspects of the present disclosure.

FIG. 2 shows a wireless communication system 200 in which LTE/LTE-A is deployed under different scenarios using shared access radio frequency spectrum, in accordance with various aspects of the present disclosure. More specifically, FIG. 2 illustrates examples of a supplemental downlink mode and a carrier aggregation mode in which LTE/LTE-A is deployed using shared access radio frequency spectrum. The wireless communication system 200 may be an example of portions of the wireless communication system 100 described with reference to FIG. 1. Moreover, the base station 205 may be an example of aspects of one or more of the base stations 105 described with reference to FIG. 1, while a first mobile device 215, a second mobile device 215-*a*, and a third mobile device 215-*b* may be examples of aspects of one or more of the mobile devices 115 described with reference to FIG. 1.

In the example of a supplemental downlink mode in the wireless communication system 200, the base station 205 may transmit OFDMA waveforms to the first mobile device 215 using a downlink channel 220. The downlink channel 220 may be associated with a frequency F1 in a shared access radio frequency spectrum. The base station 205 may transmit OFDMA waveforms to the first mobile device 215 using a first bidirectional link 225 and may receive SC-FDMA waveforms from the first mobile device 215 using the first bidirectional link 225. The first bidirectional link 225 may be associated with a frequency F4 in a licensed radio frequency spectrum. The downlink channel 220 in the shared access radio frequency spectrum and the first bidirectional link 225 in the licensed radio frequency spectrum may operate concurrently. The downlink channel 220 may provide a downlink capacity offload for the base station 205. In some examples, the downlink channel 220 may be used for unicast services (e.g., addressed to one mobile device) or for multicast services (e.g., addressed to several mobile devices). This scenario may occur with any service provider (e.g., an MNO) that uses a licensed radio frequency spectrum and needs to relieve some of the traffic and/or signaling congestion.

In one example of a carrier aggregation mode in the wireless communication system 200, the base station 205 may transmit OFDMA waveforms to the second mobile device 215-*a* using a second bidirectional link 230 and may receive OFDMA waveforms, SC-FDMA waveforms, and/or resource block interleaved FDMA waveforms from the second mobile device 215-*a* using the second bidirectional link 230. The second bidirectional link 230 may be associated with the frequency F1 in shared access radio frequency spectrum. The base station 205 may also transmit OFDMA waveforms to the second mobile device 215-*a* using a third bidirectional link 235 and may receive SC-FDMA waveforms from the second mobile device 215-*a* using the third bidirectional link 235. The third bidirectional link 235 may be associated with a frequency F2 in licensed radio frequency spectrum. The second bidirectional link 230 may provide a downlink and uplink capacity offload for the base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the base station 205 may transmit OFDMA waveforms to the third mobile device 215-*b* using a fourth bidirectional link 240 and may receive OFDMA waveforms, SC-FDMA waveforms, and/or resource block interleaved waveforms from the third mobile device 215-*b* using the fourth bidirectional link 240. The fourth bidirectional link 240 may be associated with a frequency F3 in shared access radio frequency spectrum. The base station 205 may also transmit OFDMA waveforms to the third mobile device 215-*b* using a fifth bidirectional link 245 and may receive SC-FDMA waveforms from the third mobile device 215-*b* using the fifth bidirectional link 245. The fifth bidirectional link 245 may be associated with the frequency F2 in licensed radio frequency spectrum. The fourth bidirectional link 240 may provide a downlink and uplink capacity offload for the base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to LTE/LTE-A licensed radio frequency spectrum. For these service providers, an operational example may include a bootstrapped mode (e.g., supplemental downlink, carrier aggregation) that uses the LTE/LTE-A primary component carrier (PCC) on the licensed radio frequency spectrum and at least one secondary component carrier (SCC) on the shared access radio frequency spectrum.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the shared access radio frequency spectrum (e.g., via second bidirectional link 230 and fourth bidirectional link 240). The carrier aggregation mechanisms supported when using shared access radio frequency spectrum may fall under a hybrid frequency division duplexing-time division duplexing (FDD-TDD) carrier aggregation or a TDD-TDD carrier aggregation with different symmetry across component carriers.

Figure 3:
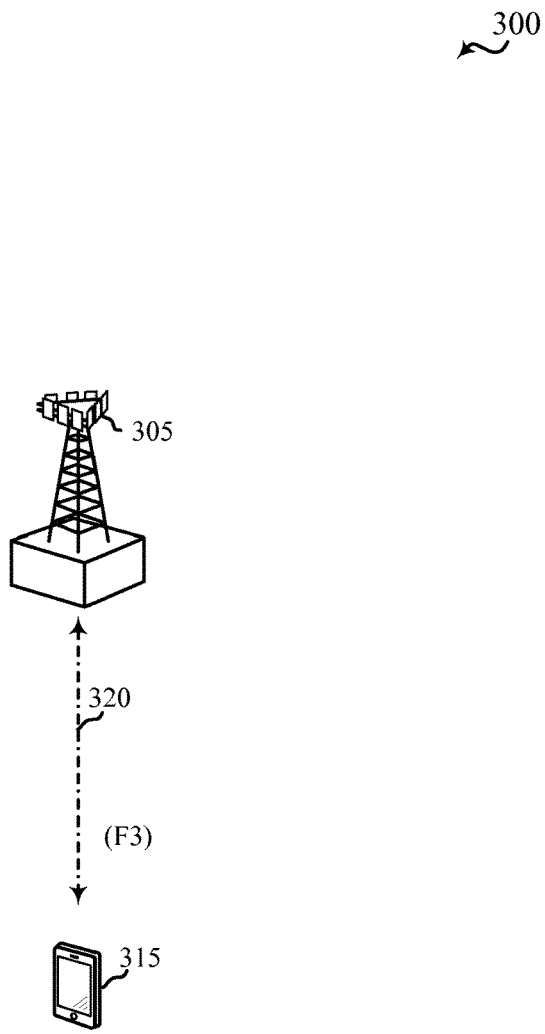
FIG. 3 shows a wireless communication system in which LTE/LTE-A is deployed in a standalone mode using shared access radio frequency spectrum, in accordance with various aspects of the present disclosure.

FIG. 3 shows a wireless communication system 300 in which LTE/LTE-A is deployed in a standalone mode using shared access radio frequency spectrum, in accordance with various aspects of the present disclosure. The wireless communication system 300 may be an example of portions of the wireless communication system 100 and/or 200 described with reference to FIGS. 1 and/or 2. Moreover, the base station 305 may be an example of aspects of one or more of the base stations 105 and/or 205 described with reference to FIGS. 1 and/or 2, while the mobile device 315 may be an example of aspects of one or more of the mobile devices 115 and/or 215 described with reference to FIGS. 1 and/or 2.

In the example of a standalone mode in the wireless communication system 300, the base station 305 may transmit OFDMA waveforms to the mobile device 315 using a bidirectional link 320 and may receive OFDMA waveforms, SC-FDMA waveforms, and/or resource block interleaved FDMA waveforms from the mobile device 315 using the bidirectional link 320. The bidirectional link 320 may be associated with the frequency F3 in the shared access radio frequency spectrum described with reference to FIG. 2. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum.

When a mobile device is operated within a wireless communication system such as the wireless communication system 100, 200, and/or 300 described with reference to FIGS. 1, 2, and/or 3, the mobile device may in some cases be operated in accordance with a number of radio resource control (RRC) states.

Figure 4:
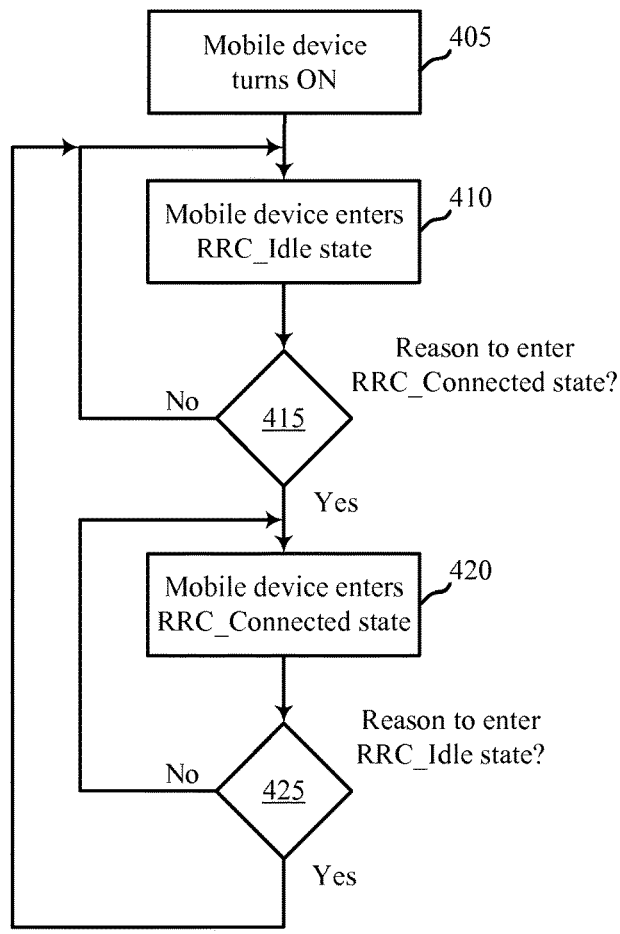
FIG. 4 is a flow chart illustrating an example of a method for wireless communication, in which a mobile device may be operated in accordance with an RRC idle state and an RRC connected state, in accordance with various aspects of the present disclosure.

FIG. 4 is a flow chart illustrating an example of a method 400 for wireless communication, in which a mobile device may be operated in accordance with an RRC idle state and an RRC connected state, in accordance with various aspects of the present disclosure. For clarity, the method 400 is described below with reference to one or more of the mobile devices 115, 215, and/or 315 described with reference to FIGS. 1, 2, and/or 3. In some examples, a mobile device such as one of the mobile devices 115, 215, and/or 315 may execute one or more sets of codes to control the functional elements of the mobile device to perform the functions described below.

At block 405, the mobile device may turn ON. Upon turning ON, the mobile device may search for a cell (e.g., a base station) to access (e.g., a cell on which to "camp" (e.g., a cell to which the mobile device may synchronize and receive control communications from, and a cell via which the mobile device may identify itself to a wireless communication system)). When camping on a cell (e.g., a serving cell), the mobile device may operate in an idle mode and/or low power mode, in which the mobile device may be woken up (e.g., actively connected), for example, by a service request from the mobile device or by a paging request received from a base station (e.g., a base station 105, 205, and/or 305 described with reference to FIGS. 1, 2, and/or 3). Upon finding a cell on which to camp, the mobile device may enter an RRC idle state at block 410. While in an RRC idle state, the mobile device may perform cell reselection, as may be required, for example, as a result of device mobility and/or a change in conditions at the mobile device, the base station, and/or the communication link between the mobile device and the base station.

At block 415, the mobile device may periodically, and/or upon the occurrence of one or more events, determine whether there is a reason to enter an RRC connected state. One reason to enter an RRC connected state is to communicate with the serving cell on which the mobile device is camped, for the purpose of making or receiving a call, transmitting or receiving data, etc. Upon determining there is a reason to enter an RRC connected state, the mobile device may enter an RRC connected state at block 420. Upon determining there is no reason to enter an RRC connected state, the mobile device may remain in an RRC idle state. While in an RRC connected state, the mobile device may undergo handover to another serving cell, as may be required, for example, as a result of device mobility and/or a change in conditions at the mobile device, the base station, and/or the communication link between the mobile device and the base station.

At block 425, the mobile device may periodically, and/or upon the occurrence of one or more events, determine whether there is a reason to enter (e.g., return to) an RRC idle state. One reason to enter an RRC idle state is because there is no longer a need to actively communicate with the serving cell on which the mobile device is camped, and thus, it may be preferable to operate in an RRC idle state to save power. Upon determining there is a reason to return to an RRC idle state, the mobile device may once again enter an RRC idle state at block 410. Upon determining there is no reason (or ability) to enter an RRC idle state, the mobile device may remain in an RRC connected state.

Figure 5:
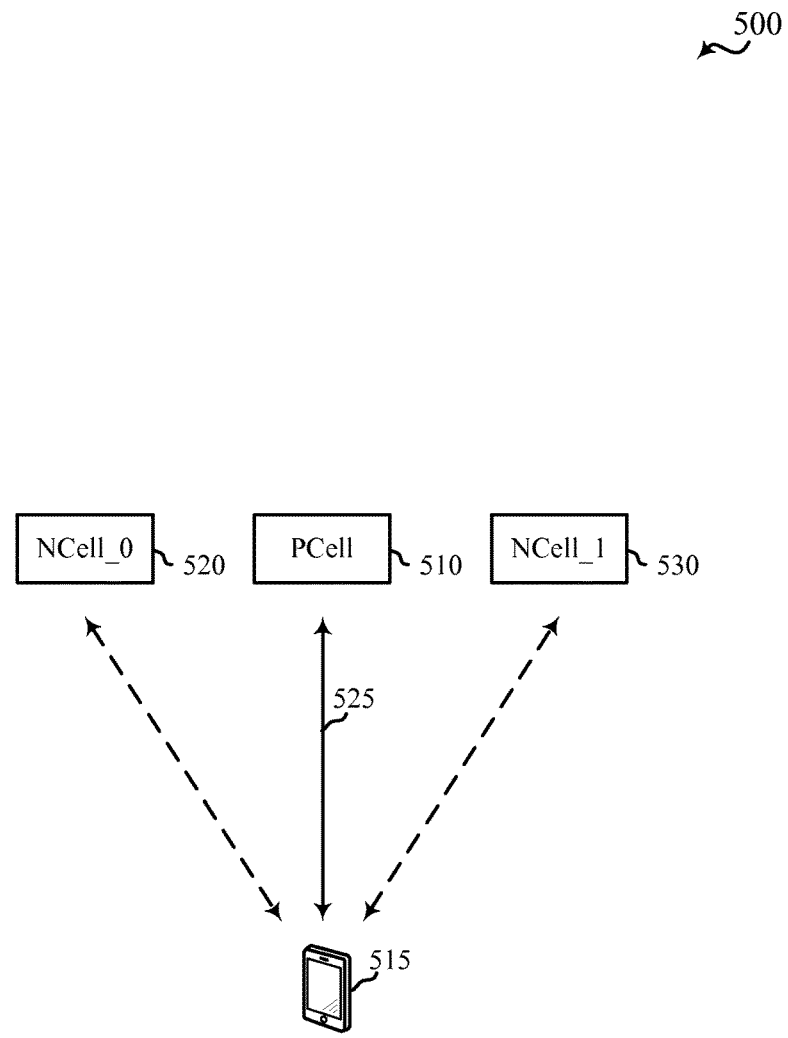
FIG. 5 illustrates an example of wireless communication between a mobile device and a primary serving cell (PCell) when the mobile device is in an RRC idle state, in accordance with various aspects of the present disclosure.

FIG. 5 illustrates an example 500 of wireless communication between a mobile device 515 and a primary serving cell (PCell) 510 when the mobile device 515 is in an RRC idle state, in accordance with various aspects of the present disclosure. The mobile device 515 may be an example of one or more aspects of the mobile device 115, 215, and/or 315 described with reference to FIGS. 1, 2, and/or 3. The PCell 510 may be an example of one or more cells operated by the base station 105, 205, and/or 305 described with reference to FIGS. 1, 2, and/or 3.

Wireless communication between the mobile device 515 and the PCell 510 may occur over a communication link 525, which may be an example of one of the communication links described with reference to FIGS. 1, 2, and/or 3.

At some point in time, and for reasons such as device mobility and/or a change in conditions at the mobile device 515, the PCell 510, and/or the communication link between the mobile device 515 and the PCell 510, the mobile device 515 may perform cell reselection. When performing cell reselection, the mobile device 515 may evaluate whether one or more neighbor cells (e.g., NCell_0 520 and/or NCell_1 530) may be available to serve as the PCell for the mobile device 515. In this regard, the mobile device 515 may identify the NCell_0 520 and/or the NCell_1 530 based on information stored on the mobile device 515 and may acquire one or more measurements pertaining to the PCell 510, the NCell_0 520, and/or the NCell_1 530. Each of the NCell_0 520 and/or the NCell_1 530 may be an example of one or more cells operated by the base station 105, 205, and/or 305 described with reference to FIGS. 1, 2, and/or 3.

Based on stored information, one or more measurements taken, and/or signaling information received from one or more of the PCell 510, the NCell_0 520, and/or the NCell_1 530, the mobile device 515 may determine that none, one, or more than one neighbor cell (e.g., NCell_0 520 and/or NCell_1 530) are available to serve as the PCell for the mobile device 515 and select another cell on which to camp in an RRC idle state.

Figure 6:
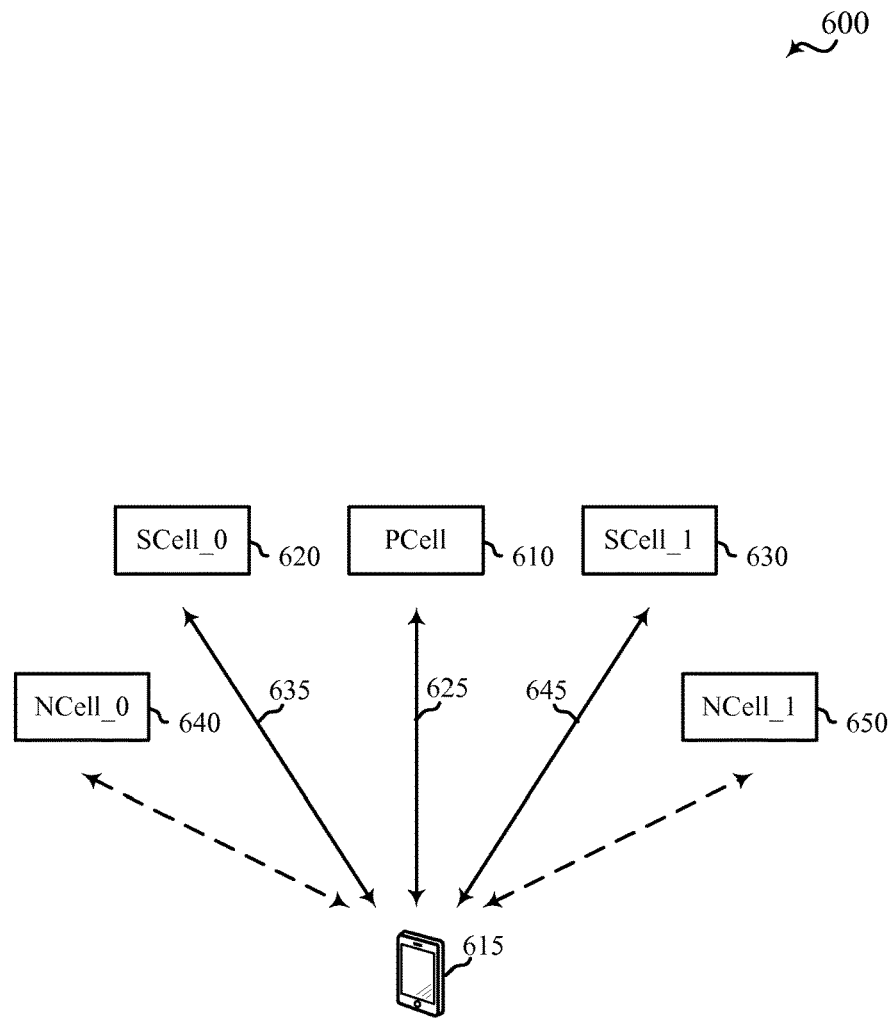
FIG. 6 illustrates an example of wireless communication between a mobile device, a primary serving cell, and a number of secondary serving cells when the mobile device is in an RRC connected state and operating in a carrier aggregation mode of communication, in accordance with various aspects of the present disclosure.

FIG. 6 illustrates an example 600 of wireless communication between a mobile device 615, a primary serving cell (PCell) 610, and a number of secondary serving cells (SCells; e.g., SCell_0 620 and/or SCell_1 630) when the mobile device 615 is in an RRC connected state and operating in a carrier aggregation mode of communication, in accordance with various aspects of the present disclosure. The mobile device 615 may be an example of one or more aspects of the mobile device 115, 215, 215-a, 215-b, and/or 515 described with reference to FIGS. 1, 2, and/or 5. Each of the PCell 610, SCell_0 620, and/or SCell_1 630 may be an example of one or more cells operated by the base station 105, 205, and/or 305 described with reference to FIGS. 1, 2, and/or 3, and/or the PCell 510, the NCell_0 520, and/or the NCell_1 530 described with reference to FIG. 5.

Wireless communication between the mobile device 615 and the PCell 610 may occur over a first communication link 625; wireless communication between the mobile device 615 and the SCell_0 620 may occur over a second communication link 635; and/or wireless communication between the mobile device 615 and the SCell_1 630 may occur over a third communication link 645. Each of the communication links may be an example of one of the communication links described with reference to FIGS. 1, 2, and/or 3.

The mobile device 615 may enter an RRC connected state with the PCell 610, at which time communication links with the SCell_0 620 and the SCell_1 630 may not yet be established. When operating in a carrier aggregation mode, the mobile device 615 may establish communication with the SCell_0 620 and the SCell_1 630 after establishing communication with the PCell 610. The number of SCells with which the mobile device 615 may communicate while communicating with a PCell 610 may vary, and in some examples may include five SCells.

At some point in time, and for reasons such as device mobility and/or a change in conditions at the mobile device 615, the PCell 610, and/or the first communication link 625 between the mobile device 615 and the PCell 610, the mobile device 615 may undergo handover to another serving cell. Before undergoing handover, the mobile device 615 may provide one or more measurement reports to the PCell 610, and the PCell 610 may evaluate, based at least in part on the one or more measurement reports, whether one or more neighbor cells (e.g., NCell_0 640, NCell_1 650, SCell_0 620, and/or SCell 630) should be the new PCell for the mobile device 615. Each of the NCell_0 640 and/or the NCell_1 650 may be an example of one or more cells operated by the base station 105, 205, and/or 305 described with reference to FIGS. 1, 2, and/or 3, and/or the PCell 510, the NCell_0 520, and/or the NCell_1 530 described with reference to FIG. 5.

Based on stored information and/or one or more measurement reports, the PCell 610 may determine that none, one, or more than one neighbor cell (e.g., NCell_00 640, NCell_1 650, SCell_0 620, and/or SCell_1 630) may serve as the new PCell for the mobile device and may select another cell for handover of the mobile device 615 in an RRC connected state. The PCell 610 may also determine whether NCell_0 and/or NCell_1 is suitable to add as another (or replacement) SCell.

Figure 7:
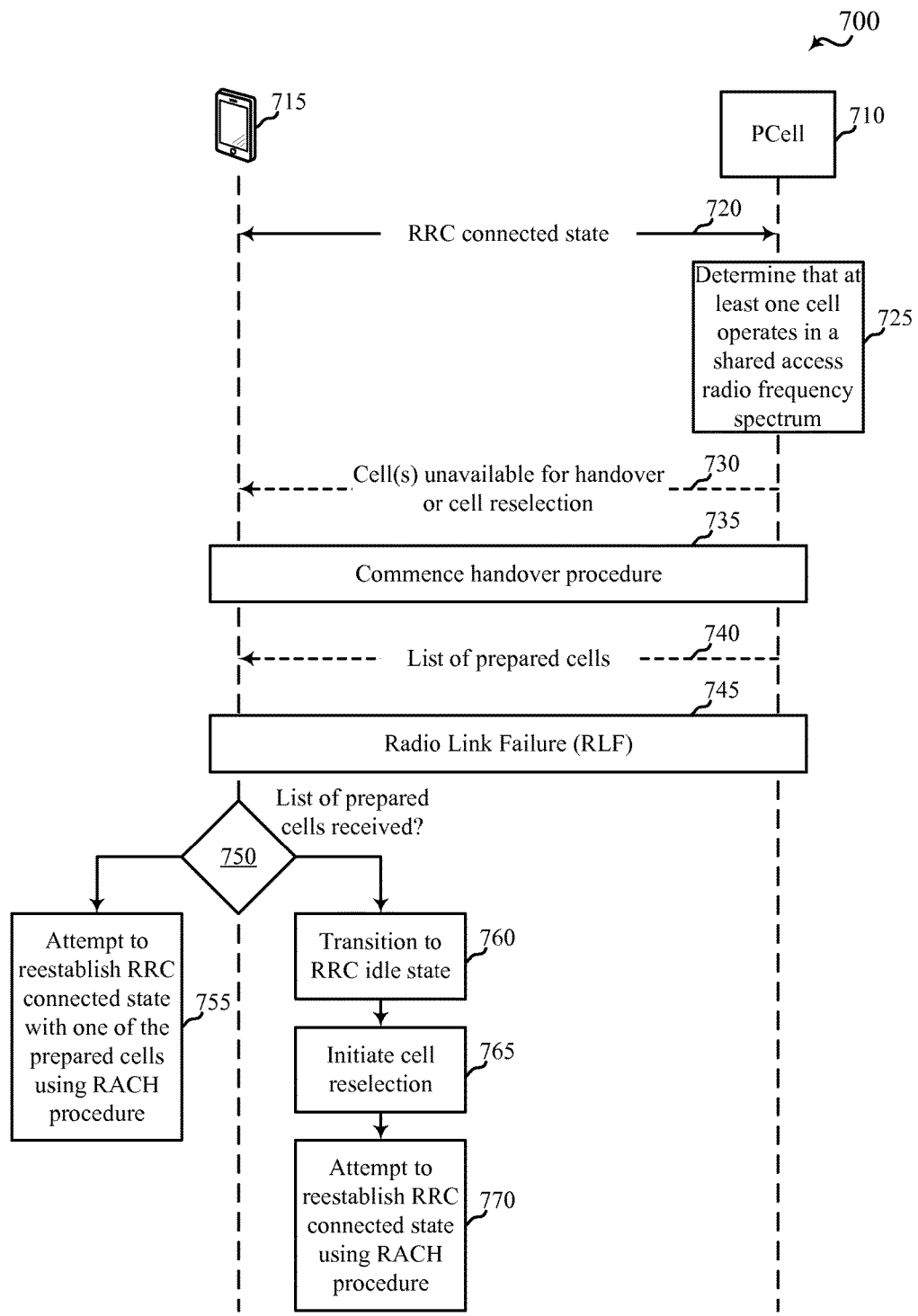
FIG. 7 shows a message flow between a mobile device and a PCell, in accordance with various aspects of the present disclosure.

FIG. 7 shows a message flow 700 between a mobile device 715 and a PCell 710, in accordance with various aspects of the present disclosure. The mobile device 715 may be an example of one or more aspects of the mobile device 115, 215, 215-a, 215-b, 315, 515, and/or 615 described with reference to FIGS. 1, 2, 3, 5, and/or 6. The PCell 710 may be an example of one or more cells operated by the base station 105, 205, and/or 305 described with reference to FIGS. 1, 2, and/or 3, and/or one or more aspects of the PCell 510 and/or 610 described with reference to FIGS. 5 and/or 6.

The message flow 700 may commence with the mobile device 715 and the PCell 710 in an RRC connected state 720. While in the RRC connected state 720, the mobile device 715 and/or the PCell 710 may transmit control and/or data signals.

At block 725, the PCell 710 may determine that at least one cell (e.g., at least one neighbor cell) operates in a shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). Cells that operate in the shared access radio frequency spectrum may be identified as prohibited from serving as PCells.

Although the PCell 710 is shown to determine that the at least one cell operates in the shared access radio frequency spectrum while the mobile device 715 and the PCell 710 are in the RRC connected state 720, the PCell 710 may alternately, or also, determine that at least one cell operates in the shared access radio frequency spectrum before the mobile device 715 and the PCell 710 are in the RRC connected state 720 (e.g., in RRC idle state). In some examples, the PCell 710 may determine that the at least one cell operates in the shared access radio frequency spectrum based on information stored on the base station that operates the PCell 710.

At one or more points in time while the mobile device 715 and the PCell 710 are in the RRC connected state 720, the PCell 710 may transmit signaling information 730 (e.g., RRC signaling information) to the mobile device 715. The signaling information 730 may be transmitted using dedicated signaling resources. The signaling information 730 may indicate that at least one cell is prohibited from serving as a PCell (or that the at least one cell may operate as an SCell), based at least in part on a determination at block 725 that the at least one cell operates in the shared access radio frequency spectrum. The signaling information 730 may also indicate, for example, that one or more frequencies of the shared access radio frequency spectrum are unavailable for cell reselection consideration as a PCell when the mobile device 715 is in an RRC idle state. For example, the mobile device 715 may not reselect one or more frequencies within the shared access radio frequency spectrum for PCell reselection consideration in the future. In another example, the signaling information 730 may include a list of frequencies within the shared access radio frequency spectrum that may not be considered for PCell reselection in the future. The one or more frequencies may in some cases be identified based at least in part on a determination, at block 725, that one or more cells operate using the one or more frequencies.

An SCell may be prohibited from serving as a PCell. However, one or more SCells identified in the signaling information 730, and/or one or more other cells (which one or more other cells may or may not have already been identified as SCells) may be used by the mobile device 715 as SCells while in the RRC connected state 720 (e.g., in a carrier aggregation mode of the mobile device 715).

While the mobile device 715 and the PCell 710 are in the RRC connected state 720, the mobility of the mobile device 715 may be managed via the PCell 710. As part of the PCell's mobility management of the mobile device 715, the PCell 710 may ensure that the mobile device 715 is handed over to a cell that is not prohibited from operating as a PCell. The PCell 710 may also configure measurement objects of the mobile device 715 to ensure that the measurement objects do not acquire PCell measurements for cells that are prohibited from serving as a PCell and/or frequencies of cells that are prohibited from serving as PCells. For example, the PCell 710 may provide a list of cells and/or frequencies that are prohibited from serving as PCell (or providing PCells) to the mobile device 715 to ensure that the mobile device 715 does not acquire PCell measurements for cells and/or frequencies on the list. However, upon a radio link failure (RLF), the PCell 710 may lose its ability to manage the mobility and measurements of the mobile device 715.

An RLF may occur during or outside a handover of the mobile device 715. By way of example, the message flow 700 shows an RLF 745 to occur after commencement (but before completion) of a handover procedure 735. At some point during the handover procedure 735, the PCell 710 may transmit to the mobile device 715 signaling information (e.g., RRC signaling information) including a list of prepared cells 740. The list of prepared cells 740 may be transmitted using dedicated signaling resources. The list of prepared cells 740 may include cells that are capable of serving as a PCell for the mobile device 715.

Following the RLF 745, the mobile device 715 may determine at block 750 whether the list of prepared cells 740 was received. When it is determined that the list of prepared cells was received, the mobile device 715 may, at block 755, attempt to access one of the prepared cells using, for example, a Random Access Channel (RACH) procedure.

When it is determined that the list of prepared cells was not received, the mobile device 715 may transition to an RRC idle state at block 760 and initiate cell reselection at block 765. During cell reselection, the mobile device 715 may determine whether signaling information received from the PCell 710 (e.g., signaling information 730) and/or other information indicates that a cell is an SCell and/or determine whether the signaling information 730 and/or other information indicates that one or more frequencies of a shared access radio frequency spectrum are unavailable for cell reselection, and avoid consideration of such cells or frequencies during cell reselection. Upon identifying a cell available for cell reselection, the mobile device 715 may attempt to access the cell at block 770 using a RACH procedure.

Figure 8:
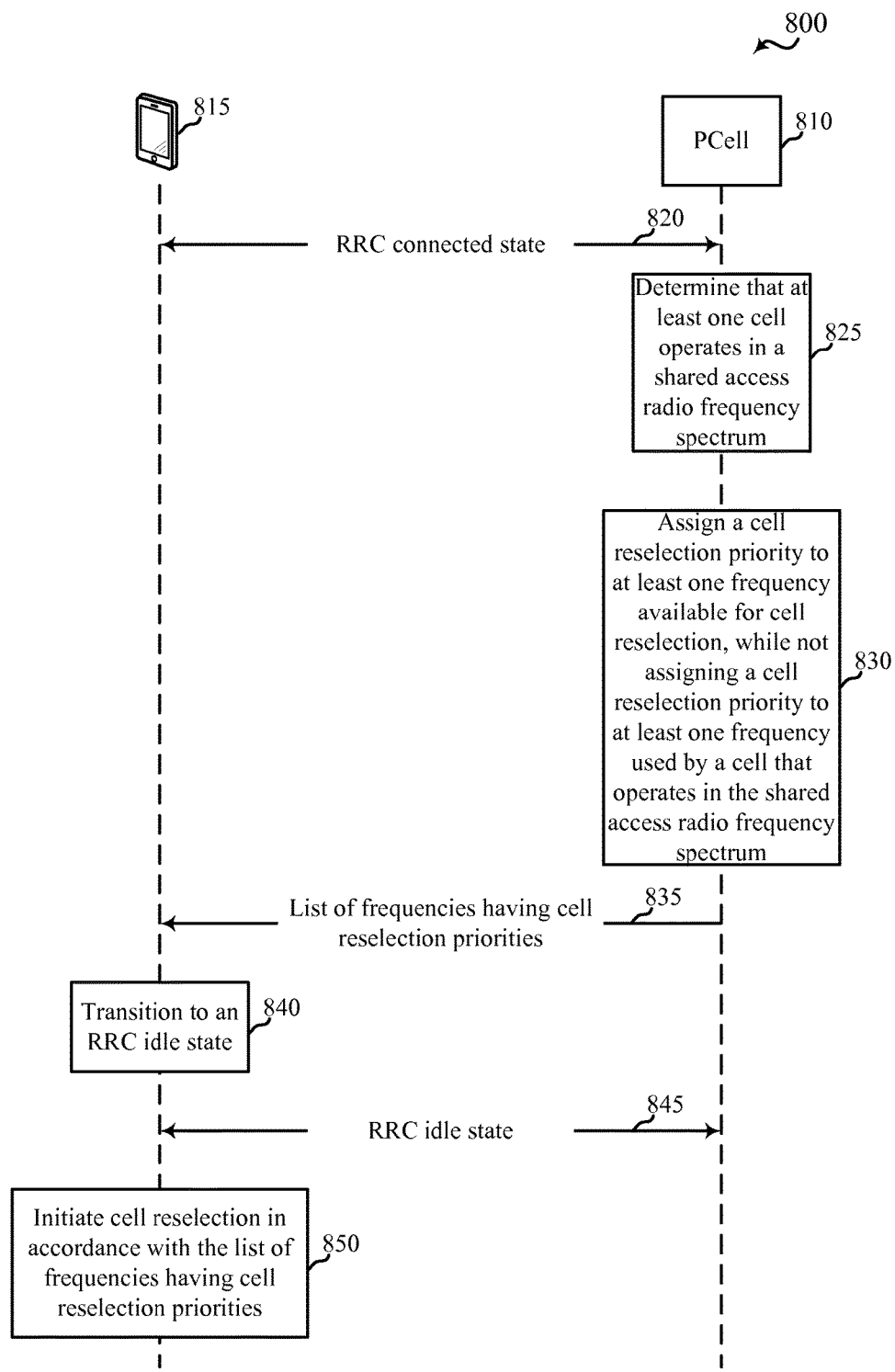
FIG. 8 shows a message flow between a mobile device and a PCell, in accordance with various aspects of the present disclosure.

FIG. 8 shows a message flow 800 between a mobile device 815 and a PCell 810, in accordance with various aspects of the present disclosure. The mobile device 815 may be an example of one or more aspects of the mobile device 115, 215, 215-*a*, 215-*b*, 315, 515, 615, and/or 715 described with reference to FIGS. 1, 2, 3, 5, 6, and/or 7. The PCell 810 may be an example of one or more cells operated by the base station 105, 205, and/or 305 described with reference to FIGS. 1, 2, and/or 3, and/or one or more aspects of the PCell 510, 610, and/or 710 described with reference to FIGS. 5, 6, and/or 7.

The message flow 800 may commence with the mobile device 815 and the PCell 810 in an RRC connected state 820. While in the RRC connected state 820, the mobile device 815 and/or the PCell 810 may transmit control and/or data signals.

At block 825, a base station that operates the PCell 810 may determine that at least one cell (e.g., at least one neighbor cell) operates in a shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). Cells that operate in the shared access radio frequency spectrum may be identified as being prohibited from serving as PCells (or as cells that may operate as SCells). In some examples, the operation(s) at block 825 may include determining a frequency or component carrier used by the at least one cell that operates in the shared access radio frequency spectrum. Although the PCell 810 is shown to determine that the at least one cell operates in the shared access radio frequency spectrum while the mobile device 815 and the PCell 810 are in the RRC connected state 820, the PCell 810 may alternately, or also, determine that at least one cell operates in the shared access radio frequency spectrum before the mobile device 815 and the PCell 810 are in the RRC connected state 820. In some examples, the PCell 810 may determine that the at least one cell operates in the shared access radio frequency spectrum based on information stored for the PCell 810

At block 830, the base station that operates the PCell 810 may assign a cell reselection priority (e.g., a priority from 0 to 7, where a priority of 0 is given highest priority for cell reselection and a priority of 7 is given lowest priority for cell reselection) to at least one frequency available for cell reselection or initial access, while not assigning a cell reselection priority to at least one frequency used by a cell that operates in the shared access radio frequency spectrum (e.g., as determined at block 825).

At one or more points in time while the mobile device 815 and the PCell 810 are in the RRC connected state 820, the PCell 810 may transmit signaling information (e.g., RRC signaling information) to the mobile device 815. The signaling information may be transmitted using dedicated signaling resources. In another example, the signaling information may be broadcast. In some examples, the signaling information may include a list of frequencies having cell reselection priorities 835 that indicate one or more frequencies that are available for cell reselection (or serve as PCells) when the mobile device 815 is in an RRC idle state. The signaling information may also indicate one or more frequencies of the shared access radio frequency spectrum that the mobile device 815 should not monitor when the mobile device 815 is in an RRC idle state. In some examples, a frequency that the mobile device 815 should not monitor may be indicated by a lack of inclusion in the list of frequencies, or by an absence of an assigned cell reselection priority for the frequency.

In another example of the signaling information, the signaling information may explicitly indicate one or more cells or frequencies of the shared access radio frequency spectrum that the mobile device 815 should not monitor when the mobile device 815 is in an RRC idle state. In this example, the signaling information may also indicate that the mobile device 815 is prohibited from accessing the one or more cells (operating on the same frequency or different frequencies) or frequencies (at least for purposes of identifying or accessing a PCell) for a time period (e.g., 300 seconds or 3 days).

At block 840, the mobile device 815 may transition to an RRC idle state 845. The mobile device 815 may transition to an RRC idle state 845 because, for example, there are no control and/or data signals that need to be transmitted between the mobile device 815 and the PCell 810.

While in the RRC idle state 845, and at block 850, the mobile device 815 may initiate cell reselection. Cell reselection may be initiated for various reasons, such as device mobility and/or a change in conditions at the mobile device 815, the PCell 810, and/or the communication link between the mobile device 815 and the PCell 810. The cell reselection initiated at block 850 may be initiated in accordance with the signaling information, including, for example, a list of frequencies having cell reselection priorities 835 received in the signaling information.

Figure 9:
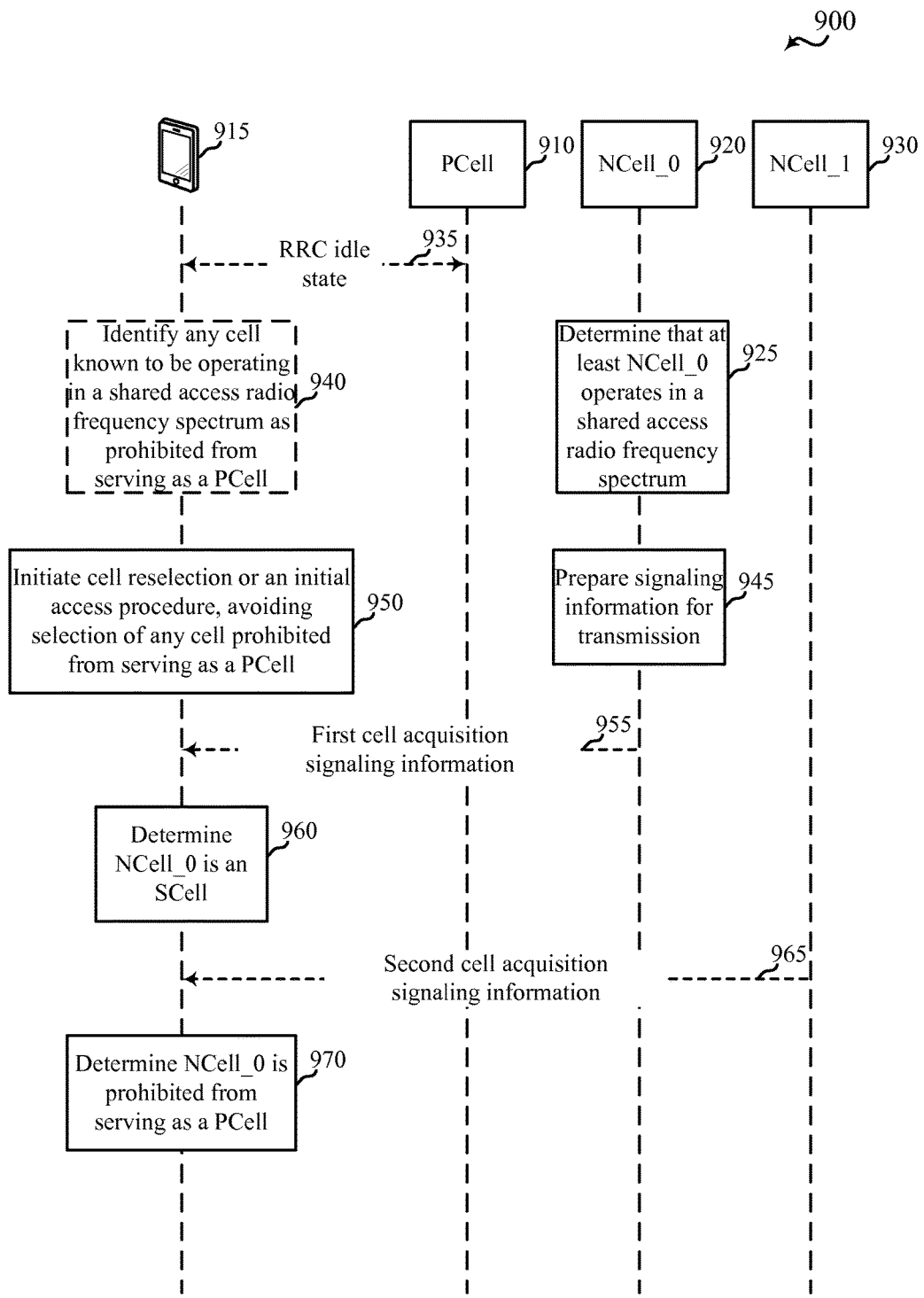
FIG. 9 shows a message flow between a mobile device, a PCell, a first neighbor cell, and/or a second neighbor cell, in accordance with various aspects of the present disclosure.

FIG. 9 shows a message flow 900 between a mobile device 915, a PCell 910, a first neighbor cell (NCell_0) 920, and/or a second neighbor cell (NCell_1) 930, in accordance with various aspects of the present disclosure. The mobile device 915 may be an example of one or more aspects of the mobile device 115, 215, 215-*a*, 215-*b*, 315, 515, 615, 715, and/or 815 described with reference to FIGS. 1, 2, 3, 5, 6, 7, and/or 8. The PCell 910 may be an example of one or more cells operated by the base station 105, 205, and/or 305 described with reference to FIGS. 1, 2, and/or 3, and/or one or more aspects of the PCell 510, 610, 710, and/or 810 described with reference to FIGS. 5, 6, 7, and/or 8. In some examples, two or more of the PCell 910, the NCell_0 920, and/or the NCell_1 930 may be provided by a single base station and/or eNB.

The message flow 900 may commence with the mobile device 915 and the PCell 910 in an RRC idle state 935 (e.g., with the mobile device 915 camped on the PCell 910), or with the mobile device 915 having no connection to a PCell (e.g., with the mobile device 915 not camped on any PCell).

Optionally, at block 940, the mobile device 915 may identify any cell known to be operating in a shared access radio frequency spectrum as being prohibited from serving as a PCell (though the cell may operate as an SCell). In some examples, a cell may be identified as a cell operating in a shared access radio frequency spectrum based at least in part on information stored on the mobile device 915, such as one or more frequency band identifiers (e.g., frequency band numbers) and/or channel identifiers (e.g., channel numbers) that uniquely identify one or more corresponding frequency ranges of the shared access radio frequency spectrum, which one or more frequency ranges are determined as being prohibited from serving as a PCell. The use of frequency band identifiers and/or channel identifiers that uniquely identify one or more corresponding frequency ranges of the shared access radio frequency spectrum may be useful in prohibiting the mobile device 915 from searching one or more frequency ranges for purposes of cell reselection, initial access, etc.

At block 925, a base station that operates the NCell_0 920 may determine whether at least the NCell_0 920 operates in a shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, the NCell_0 920 may determine whether at least the NCell_0 920 operates in the shared access radio frequency spectrum based on information stored on the base station that operates the NCell_0. The NCell_0 920 may determine whether at least the NCell_0 920 operates in the shared access radio frequency spectrum at any time, and the timing of the block 925 is merely an exemplary timing.

When the base station that operates the NCell_0 920 determines that at least the NCell_0 920 operates in the shared access radio frequency spectrum, the NCell_0 920 may prepare signaling information for transmission at block 945. The signaling information may be prepared as cell acquisition signaling information and may indicate that the NCell_0 920 is prohibited from serving as a PCell (or that the NCell_0 920 may operate as an SCell). By way of example, the signaling information may be broadcast to all mobile devices within the coverage area of the NCell_0 920.

At block 950, the mobile device 915 may initiate cell reselection or an initial access procedure. For example, cell reselection may be initiated for various reasons, such as device mobility and/or a change in conditions at the mobile device 915, the PCell 910, and/or the communication link between the mobile device 915 and the PCell 910. In another example, an initial access procedure may be initiated, for example, because the mobile device 915 is turned ON or because the mobile device moves from an area where no cellular service is provided to an area where cellular service is provided. The cell reselection or initial access procedure initiated at block 950 may be initiated in accordance with the cell identifications, if any, made at block 940. Cells identified at block 940 may not be considered for cell reselection or initial access.

Following initiation of cell reselection or an initial access procedure, the mobile device 915 may identify the NCell_0 920 as a cell available for performing cell reselection or initial access and receive first cell acquisition signaling information 955 from the NCell_0 920. The first cell acquisition signaling information 955 may be transmitted by the NCell_0 920 using, for example, a primary synchronization signal (PSS), a secondary synchronization signal (SSS), a cell reference signal (CRS), an evolved cell reference signal (eCRS), and/or a clear channel assessment (CCA) exempt transmission (CET) frame that is coded or modified to indicate that the NCell_0 920 is prohibited from serving as a PCell (or that the NCell_0 920 may operate as an SCell).

Upon receiving and decoding the first cell acquisition signaling information 955, the mobile device 915 may determine at block 960, based at least in part on the first cell acquisition signaling information 955, that the NCell_0 920 is prohibited from serving as a PCell (or that the NCell_0 920 may operate as an SCell). Upon making this determination, the mobile device 915 may select another cell (e.g., NCell_1 930) for performing cell reselection or an initial access procedure and receive second cell acquisition signaling information 965 from NCell_1 930.

The second cell acquisition signaling information 965 may be transmitted by the NCell_1 930 using, for example, a PSS, an SSS, a CRS, an eCRS, and/or a CET frame. The second cell acquisition signaling information 965 may indicate whether the NCell_1 930 is prohibited from serving as a PCell (or that the NCell_1 930 may operate as an SCell). If the second cell acquisition signaling information 965 does not indicate that the NCell_1 930 is prohibited from serving as a PCell (or that the NCell_1 930 is an SCell), the mobile device 915 may continue its cell reselection or initial access procedure, with NCell_1, at block 970. Otherwise, if the second cell acquisition signaling information 965 indicates that the NCell_1 930 is prohibited from serving as a PCell (or that the NCell_1 930 is an SCell), the mobile device 915 may select another cell (e.g., PCell 910) for performing cell reselection or an initial access procedure.

By indicating in cell acquisition signaling information whether a cell is prohibited from serving as a PCell (or that that the cell may operate as an SCell), per cell flexibility in indicating a cell type (e.g., PCell capable or only SCell capable) may be provided. In some examples, one MNO may use cell acquisition signaling information to designate a frequency as prohibited from serving as a PCell, while another MNO may use cell acquisition signaling information to designate the frequency as prohibited from serving as a PCell (e.g., for standalone operation). In other examples, an MNO may also use cell acquisition signaling information to designate certain cells, but not others, as prohibited from serving as a PCell.

Figure 10:
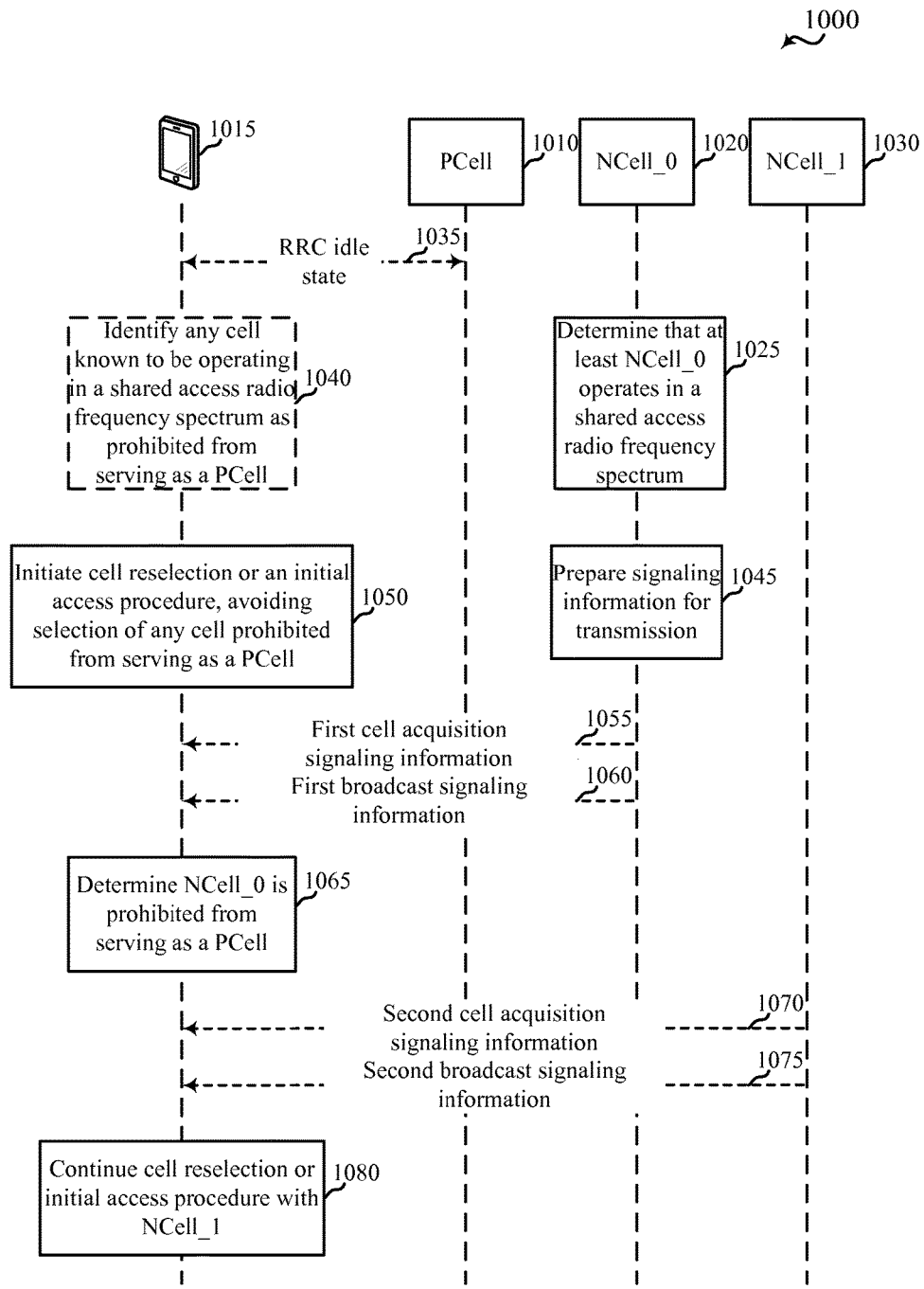
FIG. 10 shows a message flow between a mobile device, a PCell, a first neighbor cell, and/or a second neighbor cell, in accordance with various aspects of the present disclosure.

FIG. 10 shows a message flow 1000 between a mobile device 1015, a PCell 1010, a first neighbor cell (NCell_0) 1020, and/or a second neighbor cell (NCell_1) 1030, in accordance with various aspects of the present disclosure. The mobile device 1015 may be an example of one or more aspects of the mobile device 115, 215, 215-*a*, 215-*b*, 315, 515, 615, 715, 815, and/or 915 described with reference to FIGS. 1, 2, 3, 5, 6, 7, 8, and/or 9. The PCell 1010 may be an example of one or more cells operated by the base station 105, 205, and/or 305 described with reference to FIGS. 1, 2, and/or 3, and/or one or more aspects of the PCell 510, 610, 710, 810, and/or 910 described with reference to FIGS. 5, 6, 7, 8, and/or 9. In some examples, two or more of the PCell 1010, the NCell_0 1020, and/or the NCell_1 1030 may be provided by a single base station and/or eNB.

The message flow 1000 may commence with the mobile device 1015 and the PCell 1010 in an RRC idle state 1035 (e.g., with the mobile device 1015 camped on the PCell 1010), or with the mobile device 1015 having no connection to a PCell (e.g., with the mobile device 1015 not camped on any PCell).

Optionally, at block 1040, the mobile device 1015 may identify any cell known to be operating in a shared access radio frequency spectrum as being prohibited from serving as a PCell (though the cell may operate as an SCell). In some examples, a cell may be identified as a cell operating in a shared access radio frequency spectrum based at least in part on information stored on the mobile device 1015, such as one or more frequency band identifiers (e.g., frequency band numbers) and/or channel identifiers (e.g., channel numbers) that uniquely identify one or more corresponding frequency ranges of the shared access radio frequency spectrum, which one or more frequency ranges are determined as being prohibited from serving as a PCell. The use of frequency band identifiers and/or channel identifiers that uniquely identify one or more corresponding frequency ranges of the shared access radio frequency spectrum may be useful in prohibiting the mobile device 1015 from searching one or more frequency ranges for purposes of cell reselection, initial access, etc.

At block 1025, a base station that operates the NCell_0 1020 may determine whether at least the NCell_0 1020 operates in a shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, the NCell_0 1020 may determine whether at least the NCell_0 1020 operates in the shared access radio frequency spectrum based on information stored on the base station that operates the NCell_0 1020. The NCell_0 1020 may determine whether at least the NCell_0 1020 operates in the shared access radio frequency spectrum at any time, and the timing of the block 1025 is merely an exemplary timing.

When the base station that operates the NCell_0 1020 determines that at least the NCell_0 1020 operates in the shared access radio frequency spectrum, the NCell_0 1020 may prepare signaling information for transmission at block 1045. The signaling information may be prepared as broadcast signaling information and may indicate that the NCell_0 1020 is prohibited from serving as a PCell (or that the NCell_0 1020 may operate as an SCell). The signaling information may also include acquisition signaling information. By way of example, the signaling information may be broadcast to all mobile devices within the overage area of the NCell_0 1020.

At block 1050, the mobile device 1015 may initiate cell reselection or an initial access procedure. For example, cell reselection may be initiated for various reasons, such as device mobility and/or a change in conditions at the mobile device 1015, the PCell 1010, and/or the communication link between the mobile device 1015 and the PCell 1010. In another example, an initial access procedure may be initiated, for example, because the mobile device 1015 is turned ON or because the mobile device moves from an area where no cellular service is provided to an area where cellular service is provided. The cell reselection or initial access procedure initiated at block 1050 may be initiated in accordance with the cell identifications, if any, made at block 1040. Cells identified at block 1040 may not be considered for cell reselection or initial access.

Following initiation of cell reselection or an initial access procedure, the mobile device 1015 may identify the NCell_0 1020 as a cell available for performing cell reselection or initial access and receive first cell acquisition signaling information 1055 from the NCell_0 1020. The first cell acquisition signaling information 1055 may be transmitted by the NCell_0 1020 using, for example, a PSS, an SSS, a CRS, an eCRS, and/or a CET frame.

Following receipt of the first cell acquisition signaling information 1055, the mobile device 1015 may receive first broadcast signaling information 1060 from the NCell_0 1020. The first broadcast signaling information 1060 may be broadcast by the NCell_0 1020 over a broadcast channel (e.g., a physical broadcast channel (PBCH)) in, for example, a master information block (MIB) (e.g., in one or more information elements of, or added to, the MIB) and/or a system information block (SIB) (e.g., in one or more information elements of, or added to, the SIB). The first broadcast signaling information 1060 may indicate that the NCell_0 1020 is prohibited from serving as a PCell (or that the NCell_0 1020 may operate as an SCell). In some examples, the first broadcast signaling information 1060 may take the form of transmitting a MIB or SIB without a RACH configuration (e.g., because a mobile device may not camp on a cell for which a RACH configuration is not provided). Although the transmission of a MIB or SIB without a RACH configuration may not be backward compatible for some mobile devices, for these mobile devices, and in some examples, the mobile device may not continue an access procedure for a cell when the mobile device does not receive a RACH configuration for the cell. In other examples, an information element added to a MIB or SIB may include, for example, one of a plurality of frequency band identifiers and/or channel identifiers that identify a frequency range of the shared access radio frequency spectrum, which frequency range of the shared access radio frequency spectrum is determined to include a frequency used by the NCell_0 1020. When a frequency range is associated with a plurality of frequency band identifiers and/or channel identifiers, a first MNO may use a first of the plurality of frequency band identifiers and/or channel identifiers to designate the frequency range as being prohibited from serving as a PCell and a second MNO may use a second of the frequency band identifiers and/or channel identifiers to designate the frequency range as being servable as a PCell (e.g., for standalone operation).

Upon receiving and decoding the first broadcast signaling information 1060, the mobile device 1015 may determine at block 1065, based at least in part on the first broadcast signaling information 1060, that the NCell_0 1020 is prohibited from serving as a PCell (or that the NCell_0 1020 may be selected as an SCell). Upon making this determination, the mobile device 1015 may select another cell (e.g., NCell_1 1030) for performing cell reselection or an initial access procedure and receive second cell acquisition signaling information 1070 from NCell_1 1030.

The second cell acquisition signaling information 1070 may be transmitted by the NCell_1 1030 using, for example, a PSS, an SSS, a CRS, an eCRS, and/or a CET frame.

Following receipt of the second cell acquisition signaling information 1070, the mobile device 1015 may receive second broadcast signaling information 1075 from the NCell_1 1030. The second broadcast signaling information may be broadcast by the NCell_1 1030 over a broadcast channel in, for example, a MIB (e.g., in one or more information elements of, or added to, the MIB) and/or a SIB (e.g., in one or more information elements of, or added to, the SIB). The second broadcast signaling information 1075 may indicate whether the NCell_1 1030 is prohibited from serving as a PCell (or that the NCell_1 1030 may operate as an SCell). If the second broadcast signaling information 1075 does not indicate that the NCell_1 1030 is prohibited from serving as a PCell (or that the NCell_1 may operate as an SCell), the mobile device 1015 may continue its cell reselection or initial access procedure, with NCell_1, at block 1080. Otherwise, if the second broadcast signaling information 1075 indicates that the NCell_1 1030 is prohibited from serving as a PCell (or that the NCell_1 may operate as an SCell), the mobile device 1015 may select another cell (e.g., PCell 1010) for performing cell reselection or an initial access procedure.

By indicating in broadcast signaling information whether a cell is prohibited from serving as a PCell (or that that the cell may operate as an SCell), per cell flexibility in indicating a cell type (e.g., PCell capable or only SCell capable) may be provided. In some examples, one MNO may use broadcast signaling information to designate a frequency as prohibited from serving as a PCell, while another MNO may use broadcast signaling information to designate the frequency as prohibited from serving as a PCell (e.g., for standalone operation). In other examples, an MNO may also use broadcast signaling information to designate certain cells, but not others, as prohibited from serving as a PCell.

Figure 11:
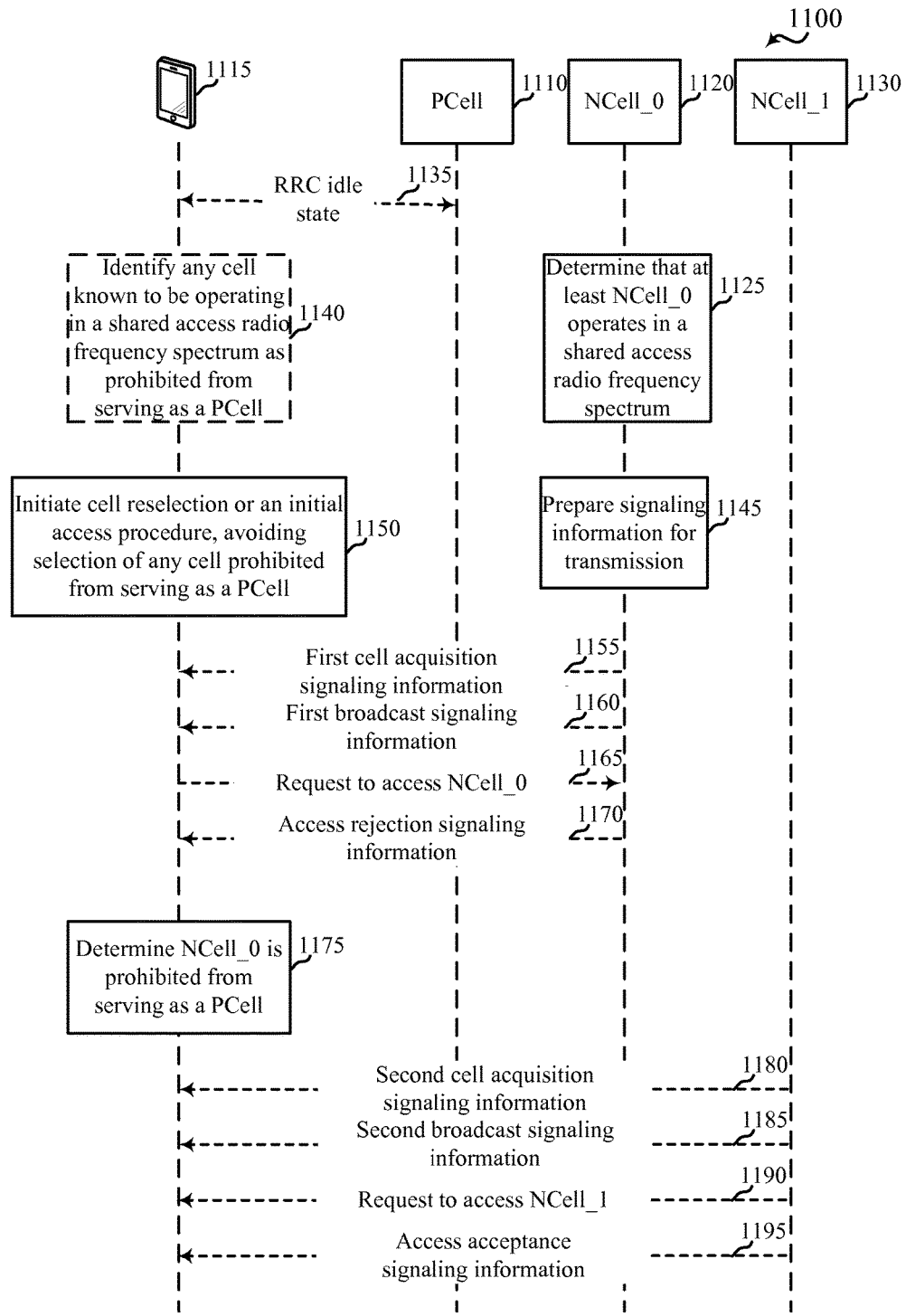
FIG. 11 shows a message flow between a mobile device, a PCell, a first neighbor cell, and/or a second neighbor cell, in accordance with various aspects of the present disclosure.

FIG. 11 shows a message flow 1100 between a mobile device 1115, a PCell 1110, a first neighbor cell (NCell_0) 1120, and/or a second neighbor cell (NCell_1) 1130, in accordance with various aspects of the present disclosure. The mobile device 1115 may be an example of one or more aspects of the mobile device 115, 215, 215-a, 215-b, 315, 515, 615, 715, 815, 915, and/or 1015 described with reference to FIGS. 1, 2, 3, 5, 6, 7, 8, 9, and/or 10. The PCell 1110 may be an example of one or more cells operated by the base station 105, 205, and/or 305 described with reference to FIGS. 1, 2, and/or 3, and/or one or more aspects of the PCell 510, 610, 710, 810, 910, and/or 1010 described with reference to FIGS. 5, 6, 7, 8, 9, and/or 10. In some examples, two or more of the PCell 1110, the NCell_0 1120, and/or the NCell_1 1130 may be provided by a single base station and/or eNB.

The message flow 1100 may commence with the mobile device 1115 and the PCell 1110 in an RRC idle state 1135 (e.g., with the mobile device 1115 camped on the PCell 1110), or with the mobile device 1115 having no connection to a PCell (e.g., with the mobile device 1115 not camped on any PCell).

Optionally, at block 1140, the mobile device 1115 may identify any cell known to be operating in a shared access radio frequency spectrum as prohibited from serving as a PCell (though the cell may operate as an SCell). In some examples, a cell may be identified as a cell operating in a shared access radio frequency spectrum based at least in part on information stored on the mobile device 1115, such as one or more frequency band identifiers (e.g., frequency band numbers) and/or channel identifiers (e.g., channel numbers) that uniquely identify one or more corresponding frequency ranges of the shared access radio frequency spectrum, which one or more frequency ranges are determined as being prohibited from serving as a PCell. The use of frequency band identifiers and/or channel identifiers that uniquely identify one or more corresponding frequency ranges of the shared access radio frequency spectrum may be useful in prohibiting the mobile device 1115 from searching one or more frequency ranges for purposes of cell reselection, initial access, etc.

At block 1125, a base station that operates the NCell_0 1120 may determine whether at least the NCell_0 1120 operates in a shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, the NCell_0 1120 may determine whether at least the NCell_0 1120 operates in the shared access radio frequency spectrum based on information stored on the base station that operates the NCell_0 1120. The NCell_0 1120 may determine whether at least the NCell_0 1120 operates in the shared access radio frequency spectrum at any time, and the timing of the block 1125 is merely an exemplary timing.

When the base station that operates the NCell_0 1120 determines that at least the NCell_0 1120 operates in the shared access radio frequency spectrum, the NCell_0 1120 may prepare signaling information for transmission at block 1145. The signaling information may be prepared as access rejection signaling information and may indicate that the NCell_0 1120 is prohibited from serving as a PCell (or that the NCell_0 1120 may operate as an SCell).

At block 1150, the mobile device 1115 may initiate cell reselection or an initial access procedure. For example, cell reselection may be initiated for various reasons, such as device mobility and/or a change in conditions at the mobile device 1115, the PCell 1110, and/or the communication link between the mobile device 1115 and the PCell 1110. In another example, an initial access procedure may be initiated, for example, because the mobile device 1115 is turned ON or because the mobile device moves from an area where no cellular service is provided to an area where cellular service is provided. The cell reselection or initial access procedure initiated at block 1150 may be initiated in accordance with the cell identifications, if any, made at block 1140. Cells identified at block 1140 may not be considered for cell reselection or initial access.

Following initiation of cell reselection or an initial access procedure, the mobile device 1115 may identify the NCell_0 1120 as a cell available for performing cell reselection or initial access and receive first cell acquisition signaling information 1155 from the NCell_0 1120. The first cell acquisition signaling information 1155 may be transmitted by the NCell_0 1120 using, for example, a PSS, an SSS, a CRS, an eCRS, and/or a CET frame.

Following receipt of the first cell acquisition signaling information 1155, the mobile device 1115 may receive first broadcast signaling information 1160 from the NCell_0 1120. The first broadcast signaling information 1160 may be broadcast by the NCell_0 1120 over a broadcast channel in, for example, a MIB (e.g., in one or more information elements of, or added to, the MIB) and/or a SIB (e.g., in one or more information elements of, or added to, the SIB).

Following receipt of the first broadcast signaling information 1160, the mobile device 1115 may transmit a request 1165 to access the NCell_0 1120 (e.g., an RRC connection request). In reply, and based at least in part on the determination at block 1125, the NCell_0 1120 may reject the request 1165 to access the NCell_0 1120 by transmitting access rejection signaling information 1170 that indicates the NCell_0 1120 is prohibited from serving as a PCell (or that the NCell_0 may operate as an SCell). The access rejection signaling information 1170 may in some examples include a rejection cause value. In some examples, the access rejection signaling information 1170 may indicate that the NCell_0 1120 is prohibited from serving as a PCell for a time period (e.g., 300 seconds or 3 days). In an example, some mobile devices (e.g., a mobile device operating under LTE/LTE-A Release 12 and prior) may not understand the rejection cause value, and thus such mobile device may discontinue access of the NCell_0 1120 as a PCell. However, in some examples, a legacy rejection cause value may be used to provide LTE/LTE-A Release 12 and prior compatibility.

Upon receiving and decoding the access rejection signaling information 1170, the mobile device 1115 may determine at block 1175, based at least in part on the access rejection signaling information 1170, that the NCell_0 1120 is prohibited from serving as a PCell (or that the NCell_0 may operate as an SCell). Upon making this determination, the mobile device 1115 may select another cell (e.g., NCell_1 1130) for performing cell reselection or an initial access procedure and receive second cell acquisition signaling information 1180 from NCell_1 1130.

The second cell acquisition signaling information 1180 may be transmitted by the NCell_1 1130 using, for example, a PSS, an SSS, a CRS, an eCRS, and/or a CET frame. Following receipt of the second cell acquisition signaling information 1180, the mobile device 1115 may receive second broadcast signaling information 1185 from the NCell_1 1130. The second broadcast signaling information may be broadcast by the NCell_1 over a broadcast channel in, for example, a MIB (e.g., in one or more information elements of, or added to, the MIB) and/or a SIB (e.g., in one or more information elements of, or added to, the SIB). Following receipt of the second broadcast signaling information 1185, the mobile device 1115 may transmit a request 1190 to access the NCell_1 1130 (e.g., an RRC connection request). If the NCell_1 1130 may be operated as a PCell, the NCell_1 1130 may transmit access acceptance signaling information 1195.

Figure 12:
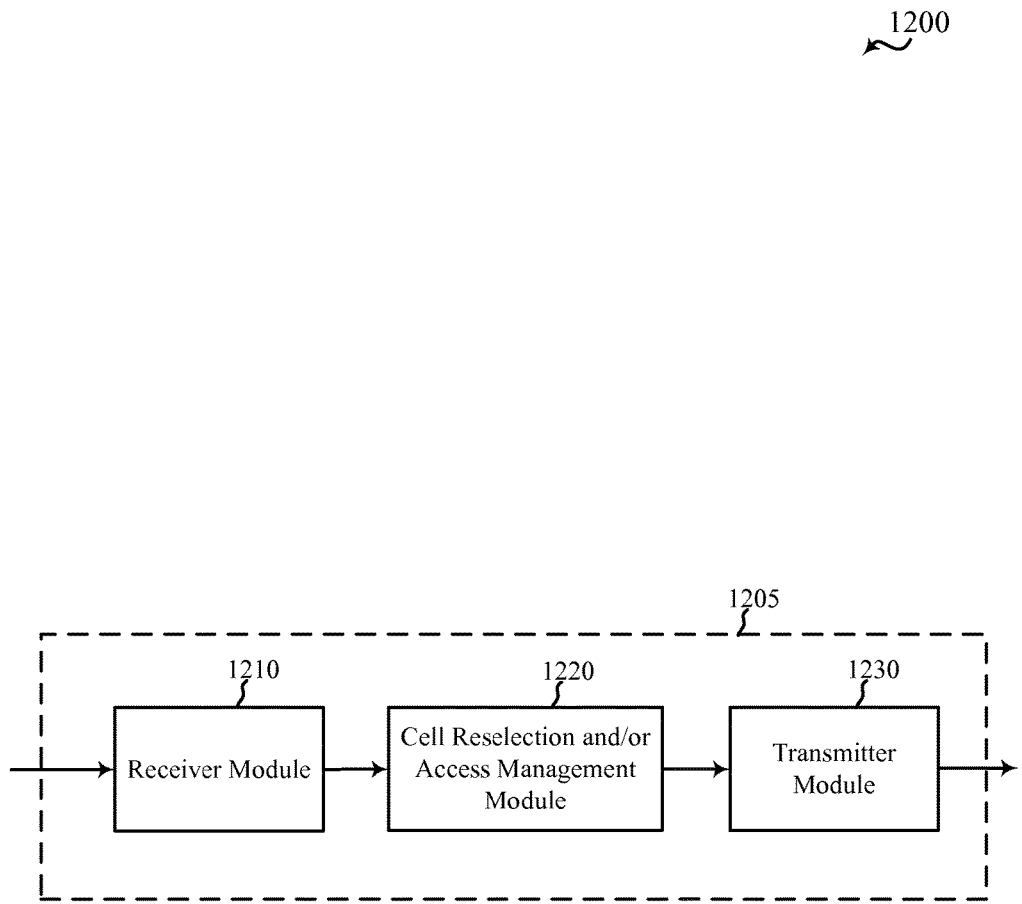
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of one or more aspects of the base station 105, 205, and/or 305 described with reference to FIGS. 1, 2, and/or 3, and may operate the PCell 510, 610, 710, 810, 910, 1010, and/or 1110 described with reference to FIGS. 5, 6, 7, 8, 9, 10, and/or 11, and/or the NCell 520, 530, 640, 650, 920, 930, 1020, 1030, 1120, and/or 1130 described with reference to FIGS. 5, 6, 9, 10, and/or 11, and/or the SCell 620 and/or 630 described with reference to FIG. 6. The apparatus 1205 may also be an example of one or more aspects of the mobile device 115, 215, 215-*a*, 215-*b*, 315, 515, 615, 715, 815, 915, 1015, and/or 1115 described with reference to FIGS. 1, 2, 3, 5, 6, 7, 8, 9, 10, and/or 11. The apparatus 1205 may also be a processor. The apparatus 1205 may include a receiver module 1210, a cell reselection and/or access management module 1220, and/or a transmitter module 1230. Each of these components may be in communication with each other.

The components of the apparatus 1205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may include at least one radio frequency (RF) receiver, such as at least one RF receiver operable to receive transmissions over licensed radio frequency spectrum (e.g., a radio frequency spectrum for which apparatuses do not contend for access because the radio frequency spectrum is licensed to particular users for particular uses) and/or shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, both the licensed radio frequency spectrum and the shared access radio frequency spectrum may be used for LTE/LTE-A communications, as described, for example, with reference to FIGS. 2 and/or 3. The receiver module 1210 may be used to receive various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the transmitter module 1230 may include at least one RF transmitter, such as at least one RF transmitter operable to transmit over the licensed radio frequency spectrum and/or the shared access radio frequency spectrum. The transmitter module 1230 may be used to transmit various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In examples of the apparatus 1205, in which the apparatus 1205 is configured as a base station that operates a PCell, NCell, and/or SCell, the cell reselection and/or access management module 1220 may be used to determine whether a cell (which cell may include part or all of the apparatus 1205 and/or another cell) operates in the shared access radio frequency spectrum. The cell reselection and/or access management module 1220 may also be used to transmit signaling information to a mobile device via the transmitter module 1230. The signaling information may be based at least in part on the determination that the cell operates in the shared access radio frequency spectrum and may indicate that the cell is prohibited from serving as a PCell (or that the cell may operate as an SCell).

In examples of the apparatus 1205, in which the apparatus 1205 is configured as a mobile device, the cell reselection and/or access management module 1220 may be used to receive signaling information from a base station. The signaling information may be received via the receiver module 1210 and may indicate that a cell operating in the shared access radio frequency spectrum is prohibited from serving as a PCell (or that the cell may operate as an SCell). The cell reselection and/or access management module 1220 may also be used to identify the cell is prohibited from serving as a PCell (or as a cell operable as an SCell) based at least in part on the received signaling information.

In other examples of the apparatus 1205, in which the apparatus 1205 is configured as a mobile device, the cell reselection and/or access management module 1220 may be used to identify a cell operating in a shared access radio frequency spectrum is prohibited from serving as a PCell (or as a cell operable as an SCell) based at least in part on information stored on the mobile device.

Figure 13:
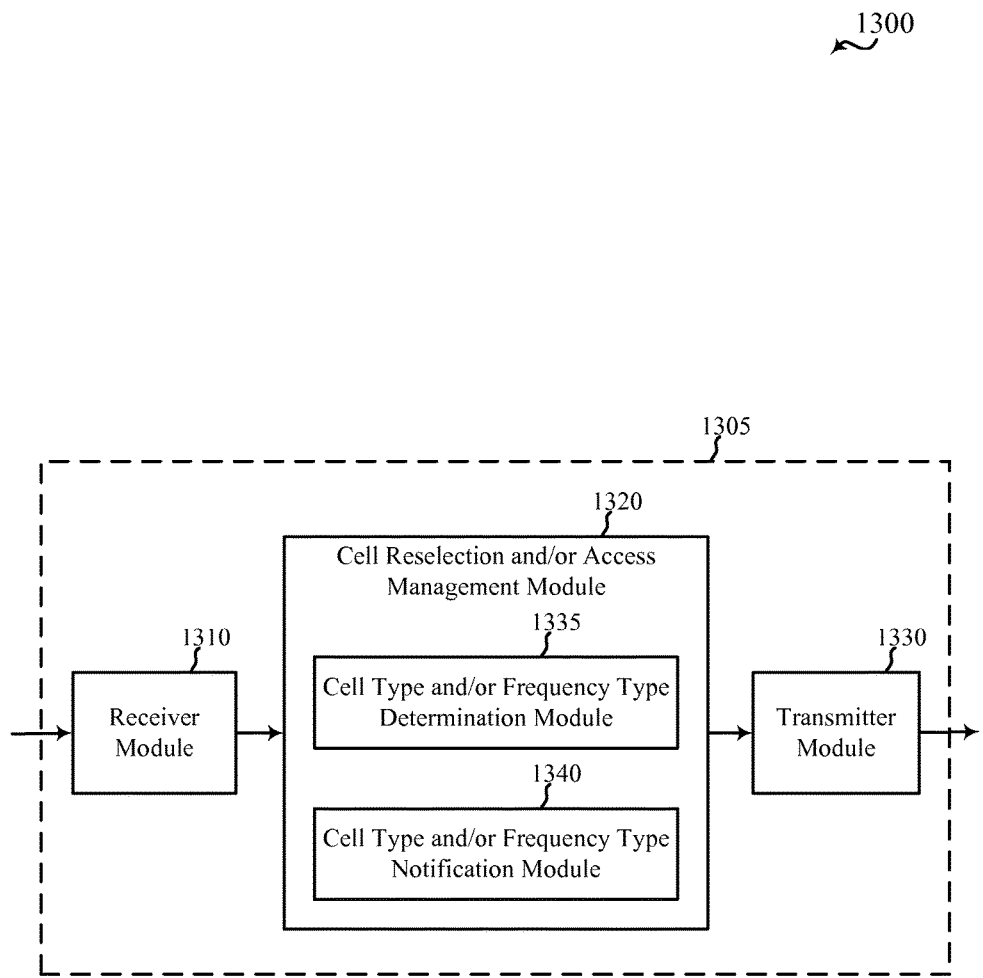
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. In some examples, the apparatus 1305 may be an example of one or more aspects of the base station 105, 205, and/or 305 described with reference to FIGS. 1, 2, and/or 3, and/or one or more aspects of the apparatus 1205 described with reference to FIG. 12, and may operate the PCell 510, 610, 710, 810, 910, 1010, and/or 1110 described with reference to FIGS. 5, 6, 7, 8, 9, 10, and/or 11, and/or the NCell 520, 530, 640, 650, 920, 930, 1020, 1030, 1120, and/or 1130 described with reference to FIGS. 5, 6, 9, 10, and/or 11, and/or the SCell 620 and/or 630 described with reference to FIG. 6. The apparatus 1305 may also be a processor. The apparatus 1305 may include a receiver module 1310, a cell reselection and/or access management module 1320, and/or a transmitter module 1330. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may include at least one RF receiver, such as at least one RF receiver operable to receive transmissions over licensed radio frequency spectrum (e.g., a radio frequency spectrum for which apparatuses do not contend for access because the radio frequency spectrum is licensed to particular users for particular uses) and/or shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, both the licensed radio frequency spectrum and the shared access radio frequency spectrum may be used for LTE/LTE-A communications, as described, for example, with reference to FIGS. 2 and/or 3. The receiver module 1310 may be used to receive various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the transmitter module 1330 may include at least one RF transmitter, such as at least one RF transmitter operable to transmit over the licensed radio frequency spectrum and/or the shared access radio frequency spectrum. The transmitter module 1330 may be used to transmit various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the cell reselection and/or access management module 1320 may be an example of one or more aspects of the cell reselection and/or access management module 1220 described with reference to FIG. 12. The cell reselection and/or access management module 1320 may include a cell type and/or frequency type determination module 1335 and/or a cell type and/or frequency type notification module 1340. Each of these components may be in communication with each other.

In some examples, the cell type and/or frequency type determination module 1335 may be used to determine whether a cell (which cell may include part or all of the apparatus 1305 and/or another cell) operates in the shared access radio frequency spectrum, as described, for example, with reference to block 725, 825, 925, 1025, and/or 1125 of FIGS. 7, 8, 9, 10, and/or 11.

In some examples, the cell type and/or frequency type notification module 1340 may be used to prepare and transmit signaling information to a mobile device via the transmitter module 1330. The signaling information may be based at least in part on a determination by the cell type and/or frequency type determination module 1335 that the cell operates in the shared access radio frequency spectrum. The signaling information may indicate that the cell is prohibited from serving as a PCell (or that the cell may operate as an SCell), as described, for example, with reference to signaling information 730, 740, 835, 955, 1060, and/or 1170 of FIGS. 7, 8, 9, 10, and/or 11. The signaling information may be prepared, for example, at block 830, 945, 1045, and/or 1145 of FIGS. 8, 9, 10, and/or 11.

When a mobile device is in an RRC connected state with the apparatus 1305, the signaling information transmitted to the mobile device may include RRC signaling information. The RRC signaling information may include any of the signaling information transmitted by the PCell 710 and/or 810 described with reference to FIGS. 7 and/or 8.

When a mobile device is in an RRC idle state with respect to the apparatus 1305, the signaling information transmitted to the mobile device may include any of the signaling information transmitted by the NCell 920, 930, 1020, 1030, 1120, and/or 1130 described with reference to FIG. 9, 10, and/or 11.

Figure 14:
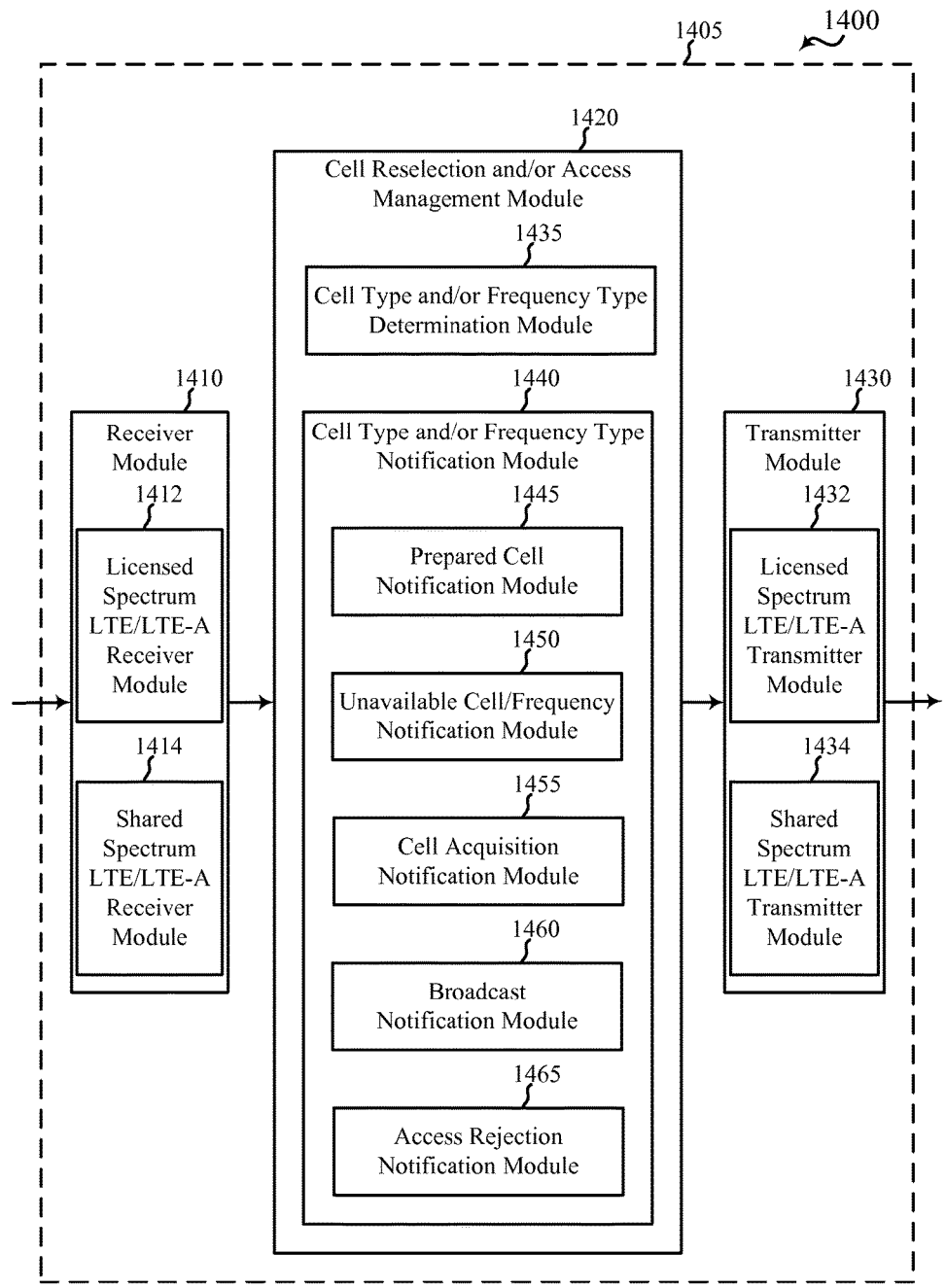
FIG. 14 shows a block diagram of an apparatus for use in wireless communication, in accordance with various aspects of the present disclosure.

FIG. 14 shows a block diagram 1400 of an apparatus 1405 for use in wireless communication, in accordance with various aspects of the present disclosure. In some examples, the apparatus 1405 may be an example of one or more aspects of the base station 105, 205, and/or 305 described with reference to FIGS. 1, 2, and/or 3, and/or one or more aspects of the apparatus 1205 and/or 1305 described with reference to FIGS. 12 and/or 13, and may operate the PCell 510, 610, 710, 810, 910, 1010, and/or 1110 described with reference to FIGS. 5, 6, 7, 8, 9, 10, and/or 11, and/or the NCell 520, 530, 640, 650, 920, 930, 1020, 1030, 1120, and/or 1130 described with reference to FIGS. 5, 6, 9, 10, and/or 11, and/or the SCell 620 and/or 630 described with reference to FIG. 6. The apparatus 1405 may also be a processor. The apparatus 1405 may include a receiver module 1410, a cell reselection and/or access management module 1420, and/or a transmitter module 1430. Each of these components may be in communication with each other.

The components of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1410 may include at least one RF receiver, such as at least one RF receiver operable to receive transmissions over licensed radio frequency spectrum (e.g., a radio frequency spectrum for which apparatuses do not contend for access because the radio frequency spectrum is licensed to particular users for particular uses) and/or shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, both the licensed radio frequency spectrum and the shared access radio frequency spectrum may be used for LTE/LTE-A communications, as described, for example, with reference to FIGS. 2 and/or 3. The receiver module 1410 may in some cases include separate receivers for the licensed radio frequency spectrum and the shared access radio frequency spectrum. The separate receivers may, in some examples, take the form of a licensed spectrum LTE/LTE-A receiver module 1412 for communicating over the licensed radio frequency spectrum, and a shared spectrum LTE/LTE-A receiver module 1414 for communicating over the shared access radio frequency spectrum. The receiver module 1410, including the licensed spectrum LTE/LTE-A receiver module 1412 and/or the shared spectrum LTE/LTE-A receiver module 1414, may be used to receive various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the transmitter module 1430 may include at least one RF transmitter, such as at least one RF transmitter operable to transmit over the licensed radio frequency spectrum and/or shared access radio frequency spectrum. In some examples, both the licensed radio frequency spectrum and the shared access radio frequency spectrum may be used for LTE/LTE-A communications, as described, for example, with reference to FIGS. 2 and/or 3. The transmitter module 1430 may in some cases include separate transmitters for the licensed radio frequency spectrum and the shared access radio frequency spectrum. The separate transmitters may, in some examples, take the form of a licensed spectrum LTE/LTE-A transmitter module 1432 for communicating over the licensed radio frequency spectrum, and a shared spectrum LTE/LTE-A transmitter module 1434 for communicating over the shared access radio frequency spectrum. The transmitter module 1430, including the licensed spectrum LTE/LTE-A transmitter module 1432 and/or the shared spectrum LTE/LTE-A transmitter module 1434, may be used to transmit various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the cell reselection and/or access management module 1420 may be an example of one or more aspects of the cell reselection and/or access management module 1220 and/or 1320 described with reference to FIGS. 12 and/or 13. The cell reselection and/or access management module 1420 may include a cell type and/or frequency type determination module 1435 and/or a cell type and/or frequency type notification module 1440. Each of these components may be in communication with each other.

In some examples, the cell type and/or frequency type determination module 1435 may be an example of the cell type and/or frequency type determination module 1335 described with reference to FIG. 13 and may be used to determine whether a cell (which cell may include part or all of the apparatus 1405 and/or another cell) operates in the shared access radio frequency spectrum, as described, for example, with reference to block 725, 825, 925, 1025, and/or 1125 of FIGS. 7, 8, 9, 10, and/or 11.

In some examples, the cell type and/or frequency type notification module 1440 may be an example of the cell type and/or frequency type notification module 1340 described with reference to FIG. 13 and may be used to prepare and transmit signaling information to a mobile device via the transmitter module 1430. The signaling information may be based at least in part on a determination by the cell type and/or frequency type determination module 1435 that the cell operates in the shared access radio frequency spectrum. The signaling information may indicate that the cell is prohibited from serving as a PCell (or that the cell may operate as an SCell). The cell type and/or frequency type notification module 1440 may include a prepared cell notification module 1445, an unavailable cell/frequency notification module 1450, a cell acquisition notification module 1455, a broadcast notification module 1460, and/or an access rejection notification module 1465.

The prepared cell notification module 1445 may be used to transmit signaling information including a list of prepared cells to a mobile device, as described, for example with reference to the signaling information of FIG. 7.

The unavailable cell/frequency notification module 1450 may be used to prepare and transmit signaling information indicating cells and/or frequencies that are unavailable for cell reselection or initial access, as described, for example, with reference to block 830 and the signaling information 730 and/or 835 of FIGS. 7 and/or 8.

The cell acquisition notification module 1455 may be used to prepare and transmit signaling information indicating that at least one cell is prohibited from serving as a PCell (or that the at least one cell may be operated as an SCell), as described, for example, with reference to block 945 and the first cell acquisition signaling information 955 of FIG. 9.

The broadcast notification module 1460 may be used to prepare and transmit signaling information indicating that at least one cell is prohibited from serving as a PCell (or that the at least one cell may be operated as an SCell), as described, for example, with reference to block 1045 and the first broadcast signaling information 1060 of FIG. 10.

The access rejection notification module 1465 may be used to prepare and transmit signaling information indicating that at least one cell is prohibited from serving as a PCell (or that the at least one cell may be operated as an SCell), as described, for example, with reference to block 1145 and the access rejection signaling information 1170 of FIG. 11.

Figure 15:
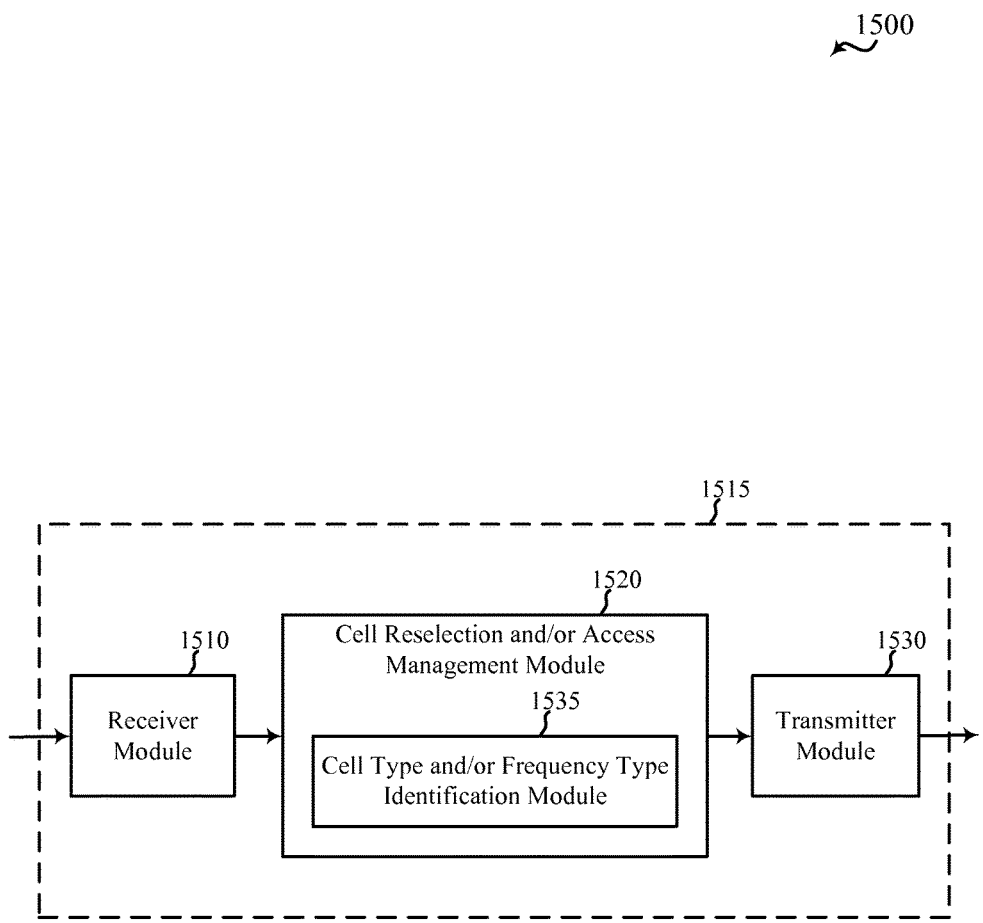
FIG. 15 shows a block diagram of an apparatus for use in wireless communication, in accordance with various aspects of the present disclosure.

FIG. 15 shows a block diagram 1500 of an apparatus 1515 for use in wireless communication, in accordance with various aspects of the present disclosure. In some examples, the apparatus 1515 may be an example of one or more aspects of the mobile device 115, 215, 215-*a*, 215-*b*, 315, 515, 615, 715, 815, 915, 1015, and/or 1115 described with reference to FIGS. 1, 2, 3, 5, 6, 7, 8, 9, 10, and/or 11, and/or one or more aspects of the apparatus 1205 described with reference to FIG. 12. The apparatus 1515 may also be a processor. The apparatus 1515 may include a receiver module 1510, a cell reselection and/or access management module 1520, and/or a transmitter module 1530. Each of these components may be in communication with each other.

The components of the apparatus 1515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1510 may include at least one RF receiver, such as at least one RF receiver operable to receive transmissions over licensed radio frequency spectrum (e.g., a radio frequency spectrum for which apparatuses do not contend for access because the radio frequency spectrum is licensed to particular users for particular uses) and/or shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, both the licensed radio frequency spectrum and the shared access radio frequency spectrum may be used for LTE/LTE-A communications, as described, for example, with reference to FIGS. 2 and/or 3. The receiver module 1510 may be used to receive various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the transmitter module 1530 may include at least one RF transmitter, such as at least one RF transmitter operable to transmit over the licensed radio frequency spectrum and/or the shared access radio frequency spectrum. The transmitter module 1530 may be used to transmit various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the cell reselection and/or access management module 1520 may be an example of one or more aspects of the cell reselection and/or access management module 1220 described with reference to FIG. 12. The cell reselection and/or access management module 1520 may include a cell type and/or frequency type identification module 1535.

In some examples, the cell type and/or frequency type identification module 1535 may be used to identify a cell operating in a shared access radio frequency spectrum is prohibited from serving as a PCell based at least in part on information stored on the apparatus 1515, as described, for example, with reference to block 940, 1040, and/or 1140 of FIGS. 9, 10, and/or 11.

Figure 16:
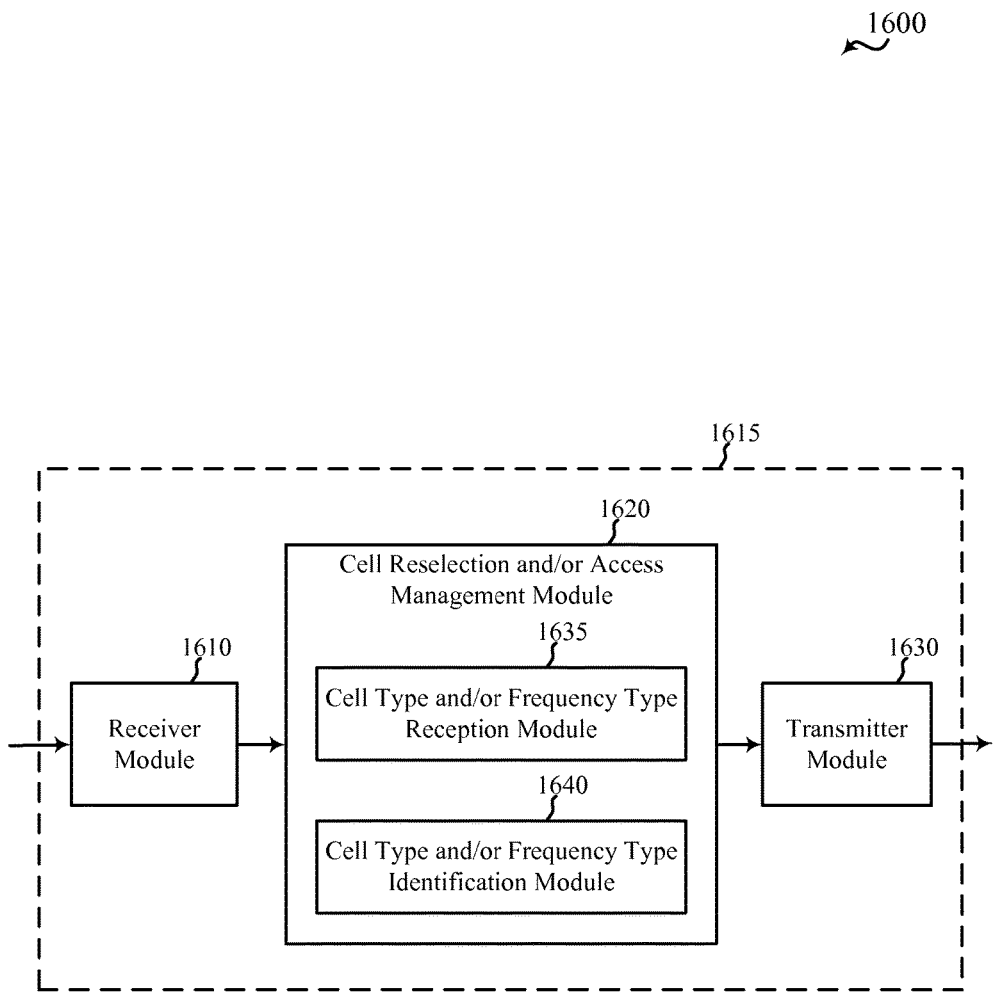
FIG. 16 shows a block diagram of an apparatus for use in wireless communication, in accordance with various aspects of the present disclosure.

FIG. 16 shows a block diagram 1600 of an apparatus 1615 for use in wireless communication, in accordance with various aspects of the present disclosure. In some examples, the apparatus 1615 may be an example of one or more aspects of the mobile device 115, 215, 215-*a*, 215-*b*, 315, 515, 615, 715, 815, 915, 1015, and/or 1115 described with reference to FIGS. 1, 2, 3, 5, 6, 7, 8, 9, 10, and/or 11, and/or one or more aspects of the apparatus 1205 and/or 1515 described with reference to FIGS. 12 and/or 15. The apparatus 1615 may also be a processor. The apparatus 1615 may include a receiver module 1610, a cell reselection and/or access management module 1620, and/or a transmitter module 1630. Each of these components may be in communication with each other.

The components of the apparatus 1615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1610 may include at least one RF receiver, such as at least one RF receiver operable to receive transmissions over licensed radio frequency spectrum (e.g., a radio frequency spectrum for which apparatuses do not contend for access because the radio frequency spectrum is licensed to particular users for particular uses) and/or shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, both the licensed radio frequency spectrum and the shared access radio frequency spectrum may be used for LTE/LTE-A communications, as described, for example, with reference to FIGS. 2 and/or 3. The receiver module 1610 may be used to receive various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the transmitter module 1630 may include at least one RF transmitter, such as at least one RF transmitter operable to transmit over the licensed radio frequency spectrum and/or the shared access radio frequency spectrum. The transmitter module 1630 may be used to transmit various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the cell reselection and/or access management module 1620 may be an example of one or more aspects of the cell reselection and/or access management module 1220 and/or 1520 described with reference to FIGS. 12 and/or 15. The cell reselection and/or access management module 1620 may include a cell type and/or frequency type reception module 1635 and/or a cell type and/or frequency type identification module 1640. Each of these components may be in communication with each other.

In some examples, the cell type and/or frequency type reception module 1635 may be used to receive signaling information from a base station indicating that a cell operating in a shared access radio frequency spectrum is prohibited from serving as a PCell, as described, for example, with reference to the signaling information 740, 835, 955, 1060, and/or 1170 of FIGS. 7, 8, 9, 10, and/or 11. The signaling information may be received via the receiver module 1610.

In some examples, the cell type and/or frequency type identification module 1640 may be used to identify a cell as prohibited from serving as a PCell based at least in part on the received signaling information, as described, for example, with reference to block 765, 850, 960, 1065, and/or 1175 of FIGS. 7, 8, 9, 10, and/or 11.

Figure 17:
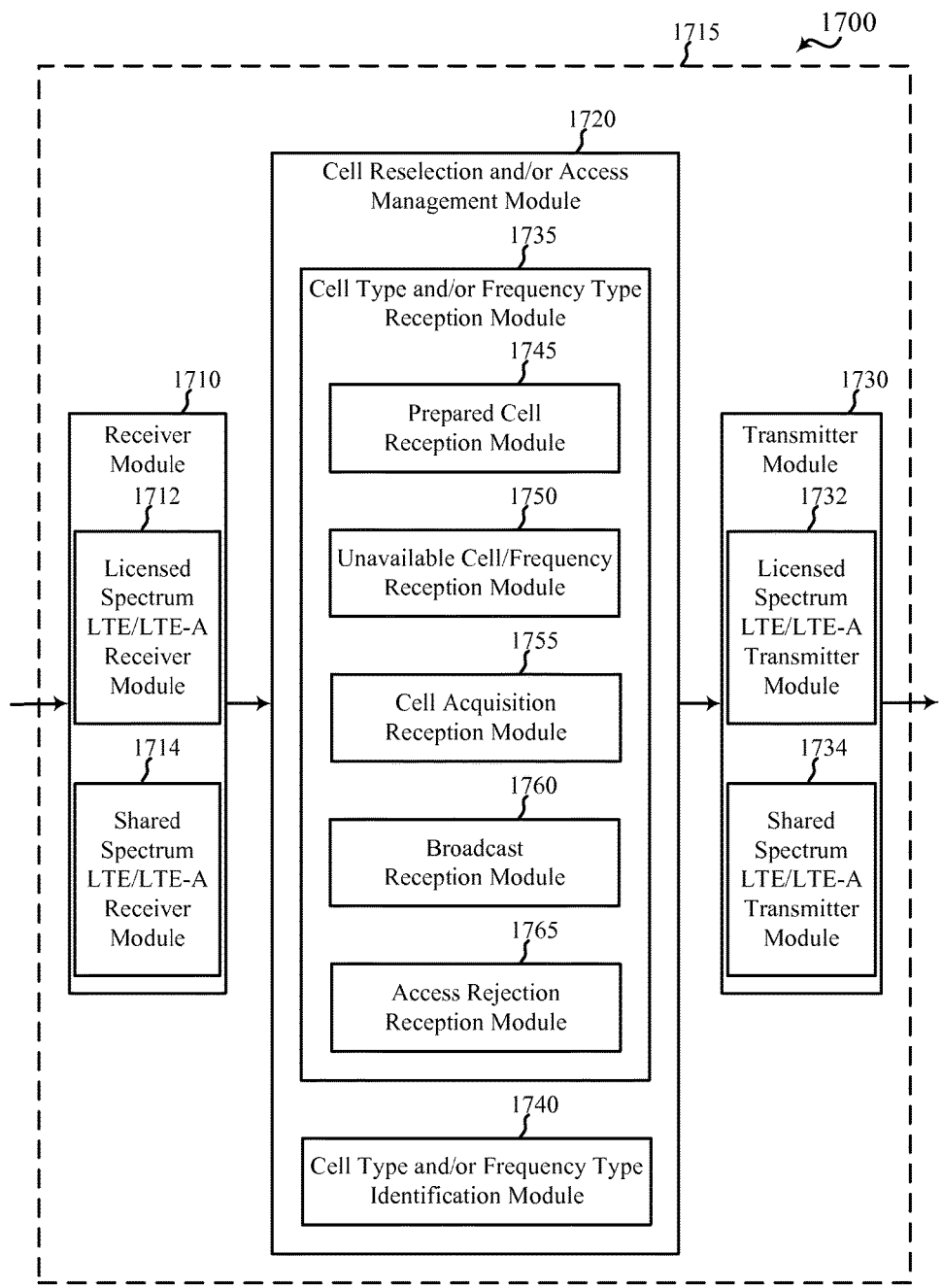
FIG. 17 shows a block diagram of an apparatus for use in wireless communication, in accordance with various aspects of the present disclosure.

FIG. 17 shows a block diagram 1700 of an apparatus 1715 for use in wireless communication, in accordance with various aspects of the present disclosure. In some examples, the apparatus 1715 may be an example of one or more aspects of the mobile device 115, 215, 215-*a*, 215-*b*, 315, 515, 615, 715, 815, 915, 1015, and/or 1115 described with reference to FIGS. 1, 2, 3, 5, 6, 7, 8, 9, 10, and/or 11, and/or one or more aspects of the apparatus 1205, 1515, and/or 1615 described with reference to FIGS. 12, 15, and/or 16. The apparatus 1715 may also be a processor. The apparatus 1715 may include a receiver module 1710, a cell reselection and/or access management module 1720, and/or a transmitter module 1730. Each of these components may be in communication with each other.

The components of the apparatus 1715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1710 may include at least one RF receiver, such as at least one RF receiver operable to receive transmissions over licensed radio frequency spectrum (e.g., a radio frequency spectrum for which apparatuses do not contend for access because the radio frequency spectrum is licensed to particular users for particular uses) and/or shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). In some examples, both the licensed radio frequency spectrum and the shared access radio frequency spectrum may be used for LTE/LTE-A communications, as described, for example, with reference to FIGS. 2 and/or 3. The receiver module 1710 may in some cases include separate receivers for the licensed radio frequency spectrum and the shared access radio frequency spectrum. The separate receivers may, in some examples, take the form of a licensed spectrum LTE/LTE-A receiver module 1712 for communicating over the licensed radio frequency spectrum, and a shared spectrum LTE/LTE-A receiver module 1714 for communicating over the shared access radio frequency spectrum. The receiver module 1710, including the licensed spectrum LTE/LTE-A receiver module 1712 and/or the shared spectrum LTE/LTE-A receiver module 1714, may be used to receive various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the transmitter module 1730 may include at least one RF transmitter, such as at least one RF transmitter operable to transmit over the licensed radio frequency spectrum and/or shared access radio frequency spectrum. In some examples, both the licensed radio frequency spectrum and the shared access radio frequency spectrum may be used for LTE/LTE-A communications, as described, for example, with reference to FIGS. 2 and/or 3. The transmitter module 1730 may in some cases include separate transmitters for the licensed radio frequency spectrum and the shared access radio frequency spectrum. The separate transmitters may, in some examples, take the form of a licensed spectrum LTE/LTE-A transmitter module 1732 for communicating over the licensed radio frequency spectrum, and a shared spectrum LTE/LTE-A transmitter module 1734 for communicating over the shared access radio frequency spectrum. The transmitter module 1630, including the licensed spectrum LTE/LTE-A transmitter module 1732 and/or the shared spectrum LTE/LTE-A transmitter module 1734, may be used to transmit various types of data and/or control signals (i.e., transmissions) over one or more communication links of a wireless communication system, such as one or more communication links of the wireless communication system 100, 200, 300, 500, and/or 600 described with reference to FIGS. 1, 2, 3, 5, and/or 6. The communication links may be established over the licensed radio frequency spectrum and/or the shared access radio frequency spectrum.

In some examples, the cell reselection and/or access management module 1720 may be an example of one or more aspects of the cell reselection and/or access management module 1220, 1520, and/or 1620 described with reference to FIGS. 12, 15, and/or 16. The cell reselection and/or access management module 1720 may include a cell type and/or frequency type reception module 1735 and/or a cell type and/or frequency type identification module 1740. Each of these components may be in communication with each other.

In some examples, the cell type and/or frequency type reception module 1735 may be an example of the cell type and/or frequency type reception module 1635 described with reference to FIG. 16 and may be used to receive signaling information from a base station indicating that a cell operating in a shared access radio frequency spectrum is prohibited from serving as a PCell. The signaling information may be received via the receiver module 1710. The cell type and/or frequency type reception module 1735 may include a prepared cell reception module 1745, an unavailable cell/frequency reception module 1750, a cell acquisition reception module 1755, a broadcast reception module 1760, and/or an access rejection reception module 1765.

The prepared cell reception module 1745 may be used to receive signaling information including a list of prepared cells 740, as described, for example, with reference to the signaling information of FIG. 7.

The unavailable cell/frequency reception module 1750 may be used to receive signaling information indicating cells and/or frequencies that are unavailable for cell reselection or initial access, as described, for example, with reference to block 830 and the signaling information 730 and/or 835 of FIGS. 7 and/or 8.

The cell acquisition reception module 1755 may be used to receive signaling information indicating that at least one cell is prohibited from serving as a PCell (or that the at least one cell may be operated as an SCell), as described, for example, with reference to block 945 and the first cell acquisition signaling information 955 of FIG. 9.

The broadcast reception module 1760 may be used to receive signaling information indicating that at least one cell is prohibited from serving as a PCell (or that the at least one cell may be operated as an SCell), as described, for example, with reference to block 1045 and the first broadcast signaling information 1060 of FIG. 10.

The access rejection reception module 1765 may be used to receive signaling information indicating that at least one cell is prohibited from serving as a PCell (or that the at least one cell may be operated as an SCell), as described, for example, with reference to block 1145 and the access rejection signaling information 1170 of FIG. 11.

In some examples, the cell type and/or frequency type identification module 1740 may be an example of the cell type and/or frequency type identification module 1640 described with reference to FIG. 16 and may be used to identify a cell as prohibited from serving as a PCell based at least in part on the received signaling information, as described, for example, with reference to block 765, 850, 960, 1065, and/or 1175 of FIGS. 7, 8, 9, 10, and/or 11.

Figure 18:
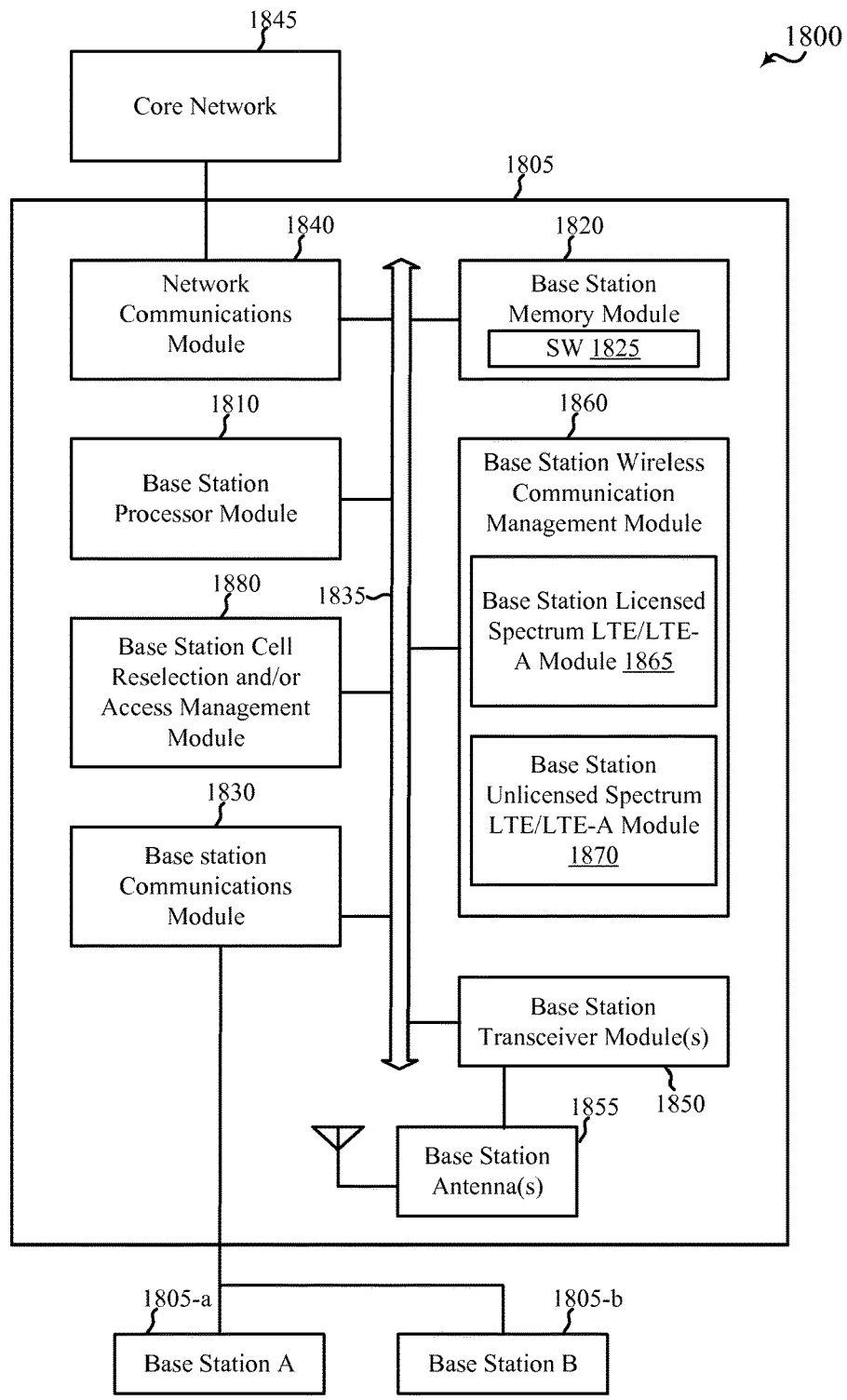
FIG. 18 shows a block diagram of base station (e.g., an eNB) for use in wireless communication, in accordance with various aspects of the present disclosure.

FIG. 18 shows a block diagram 1800 of base station 1805 (e.g., an eNB) for use in wireless communication, in accordance with various aspects of the present disclosure. In some examples, the base station 1805 may be an example of one or more aspects of the base station 105, 205, and/or 305 described with reference to FIGS. 1, 2, and/or 3, and/or one or more aspects of the PCell 510, 610, 710, 810, 910, 1010, and/or 1110 described with reference to FIGS. 5, 6, 7, 8, 9, 10, and/or 11, and/or one or more aspects of the NCell 520, 530, 640, 650, 920, 930, 1020, 1030, 1120, and/or 1130 described with reference to FIGS. 5, 6, 9, 10, and/or 11, and/or one or more aspects of the SCell 620 and/or 630 described with reference to FIG. 6, and/or one or more aspects of the apparatus 1205, 1305, and/or 1405 described with reference to FIGS. 12, 13, and/or 14. The base station 1805 may be configured to implement or facilitate at least some of the base station, cell, and/or apparatus features and functions described with reference to FIGS. 1, 2, 3, 5, 6, 7, 8, 9, 10, 11, 12, 13, and/or 14. The base station 1805 may include a base station processor module 1810, a base station memory module 1820, at least one base station transceiver module (represented by base station transceiver module(s) 1850), at least one base station antenna (represented by base station antenna(s) 1855), a base station wireless communication management module 1860, and/or a base station cell reselection and/or access management module 1880. The base station 1805 may also include one or more of a base station communications module 1830 and/or a network communications module 1840. Each of these components may be in communication with each other, directly or indirectly, over one or more buses 1835.

The base station memory module 1820 may include random access memory (RAM) and/or read-only memory (ROM). The base station memory module 1820 may store computer-readable, computer-executable software (SW) code 1825 containing instructions that are configured to, when executed, cause the base station processor module 1810 to perform various functions described herein related to handover, cell reselection, or an initial access procedure. Alternatively, the software code 1825 may not be directly executable by the base station processor module 1810 but be configured to cause the base station 1805 (e.g., when compiled and executed) to perform various of the functions described herein.

The base station processor module 1810 may include an intelligent hardware device, e.g., a central processing unit (CPU), a microcontroller, an ASIC, etc. The base station processor module 1810 may process information received through the base station transceiver module(s) 1850, the base station communications module 1830, and/or the network communications module 1840. The base station processor module 1810 may also process information to be sent to the transceiver module(s) 1850 for transmission through the antenna(s) 1855, to the base station communications module 1830, for transmission to one or more other base stations 1805-*a* and 1805-*b*, and/or to the network communications module 1840 for transmission to a core network 1845, which may be an example of one or more aspects of the core network 130 described with reference to FIG. 1. The base station processor module 1810 may handle, alone or in connection with the base station wireless communication management module 1860 and/or the base station cell reselection and/or access management module 1880, various aspects of communicating over (or managing communications over) a first radio frequency spectrum (e.g., a licensed radio frequency spectrum usable for LTE/LTE-A communications) and/or a second radio frequency spectrum (e.g., a shared access radio frequency spectrum usable for LTE/LTE-A communications).

The base station transceiver module(s) 1850 may include a modem configured to modulate packets and provide the modulated packets to the base station antenna(s) 1855 for transmission, and to demodulate packets received from the base station antenna(s) 1855. The base station transceiver module(s) 1850 may, in some examples, be implemented as one or more base station transmitter modules and one or more separate base station receiver modules. The base station transceiver module(s) 1850 may support communications in the first radio frequency spectrum and/or the second radio frequency spectrum. The base station transceiver module(s) 1850 may be configured to communicate bi-directionally, via the antenna(s) 1855, with one or more mobile stations or apparatuses, such as one or more of the mobile devices **115, 215, 215-*a*, 215-*b*, 315, 515, 615, 715, 815, 915, 1015, and/or 1115 described with reference to FIGS. 1, 2, 3, 5, 6, 7, 8, 9, 10, and/or 11, and/or one or more of the apparatuses 1205, 1515, 1615, and/or 1715 described with reference to FIGS. 12, 15, 16, and/or 17, for example. The base station 1805 may, for example, include multiple base station antennas 1855 (e.g., an antenna array). The base station 1805 may communicate with the core network 1845 through the network communications module 1840. The base station 1805 may also communicate with other base stations or base stations, such as the base stations 1805**-*a* and 1805-*b*, using the base station communications module 1830.

The base station wireless communication management module 1860 may be configured to perform and/or control some or all of the features and/or functions described with reference to FIGS. 1, 2, 3, 5, 6, 7, 8, 9, 10, 11, 12, 13, and/or 14 related to wireless communication over the first radio frequency spectrum and/or the second radio frequency spectrum. For example, the base station wireless communication management module 1860 may be configured to support a supplemental downlink mode, a carrier aggregation mode, and/or a standalone mode of operation using the first radio frequency spectrum and/or the second radio frequency spectrum. The base station wireless communication management module 1860 may include a base station licensed spectrum LTE/LTE-A module 1865 configured to handle LTE/LTE-A communications in the first radio frequency spectrum, and a base station shared spectrum LTE/LTE-A module 1870 configured to handle LTE/LTE-A communications in the second radio frequency spectrum. The base station wireless communication management module 1860, or portions of it, may include a processor, and/or some or all of the functions of the base station wireless communication management module 1860 may be performed by the base station processor module 1810 and/or in connection with the base station processor module 1810.

The base station cell reselection and/or access management module 1880 may be configured to perform and/or control some or all of the features and/or functions described with reference to FIGS. 1, 2, 3, 5, 6, 7, 8, 9, 10, 11, 12, 13, and/or 14 related to cell reselection and/or initial access of cells using the first radio frequency spectrum and/or the second radio frequency spectrum. In some examples, the base station cell reselection and/or access management module 1880 may be an example of one or more aspects of the cell reselection and/or access management module 1220, 1320, and/or 1420 described with reference to FIGS. 12, 13, and/or 14. The base station cell reselection and/or access management module 1880, or portions of it, may include a processor, and/or some or all of the functions of the base station cell reselection and/or access management module 1880 may be performed by the base station processor module 1810 and/or in connection with the base station processor module 1810.

Figure 19:
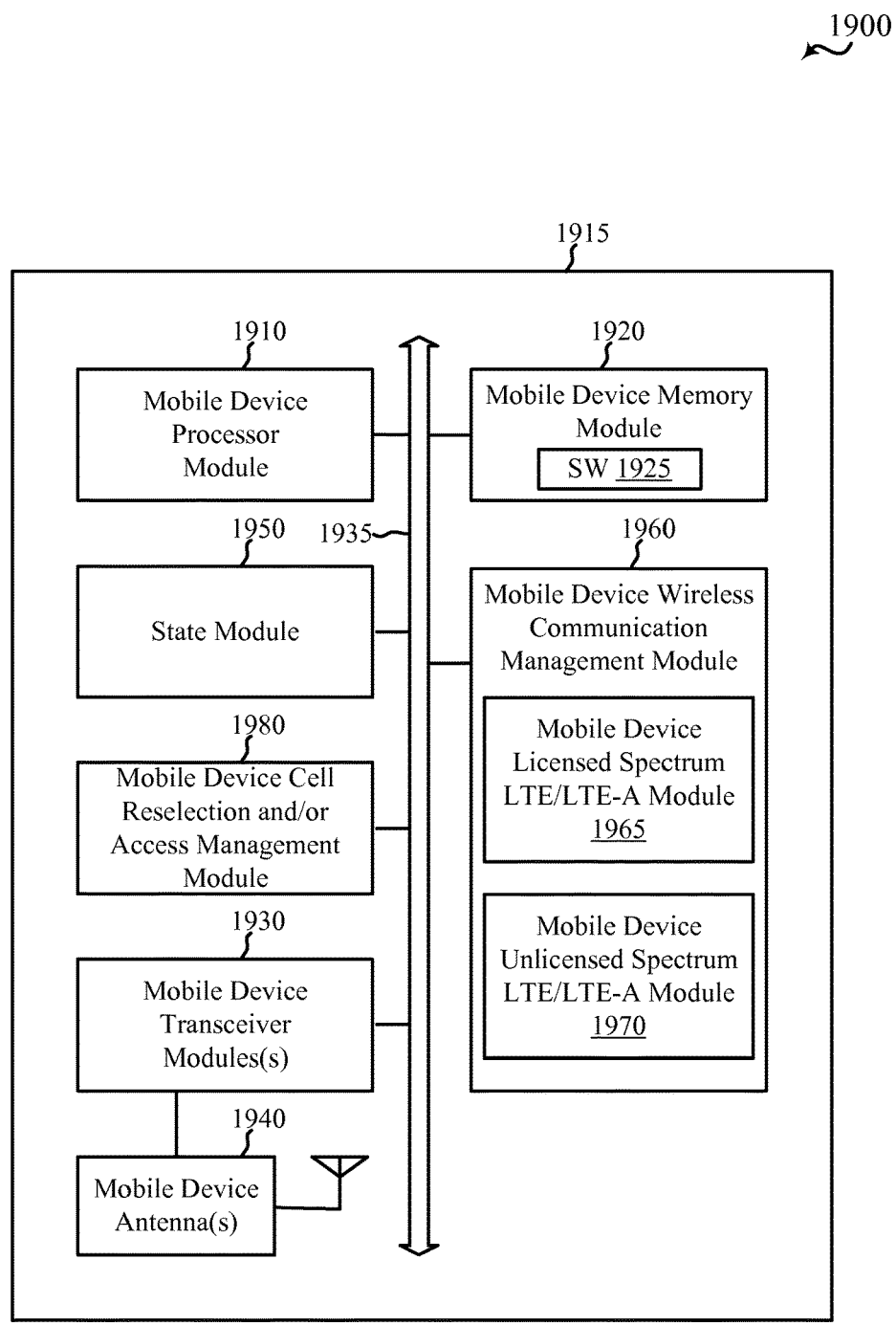
FIG. 19 shows a block diagram of a mobile device (e.g., a UE) for use in wireless communication, in accordance with various aspects of the present disclosure.

FIG. 19 shows a block diagram 1900 of a mobile device 1915 (e.g., a UE) for use in wireless communication, in accordance with various aspects of the present disclosure. The mobile device 1915 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The mobile device 1915 may, in some examples, have an internal power supply (not shown), such as a small battery, to facilitate mobile operation. In some examples, the mobile device 1915 may be an example of one or more aspects of the mobile device **115, 215, 215-*a*, 215-*b*, 315, 515, 615, 715, 815, 915, 1015, and/or 1115 described with reference to FIGS. 1, 2, 3, 5, 6, 7, 8, 9, 10, and/or 11, and/or one or more aspects of the apparatus 1205, 1515, 1615, and/or 1715 described with reference to FIGS. 12, 15, 16, and/or 17. The mobile device 1915 may be configured to implement at least some of the mobile device and/or apparatus features and functions described with reference to FIGS. 1, 2, 3, 5, 6, 7, 8, 9, 10, 11, 12, 15, 16, and/or 17**.

The mobile device 1915 may include a mobile device processor module 1910, a mobile device memory module 1920, at least one mobile device transceiver module (represented by mobile device transceiver module(s) 1930), at least one mobile device antenna (represented by mobile device antenna(s) 1940), a mobile device wireless communication management module 1960, and/or a mobile device cell reselection and/or access management module 1980. Each of these components may be in communication with each other, directly or indirectly, over one or more buses 1935.

The mobile device memory module 1920 may include RAM and/or ROM. The mobile device memory module 1920 may store computer-readable, computer-executable software (SW) code 1925 containing instructions that are configured to, when executed, cause the mobile device processor module 1910 to perform various functions described herein related to handover, cell reselection, or an initial access procedure. Alternatively, the software code 1925 may not be directly executable by the mobile device processor module 1910 but be configured to cause the mobile device 1915 (e.g., when compiled and executed) to perform various of the functions described herein.

The mobile device processor module 1910 may include an intelligent hardware device, e.g., a CPU, a microcontroller, an ASIC, etc. The mobile device processor module 1910 may process information received through the mobile device transceiver module(s) 1930 and/or information to be sent to the mobile device transceiver module(s) 1930 for transmission through the mobile device antenna(s) 1940. The mobile device processor module 1910 may handle, alone or in connection with the mobile device wireless communication management module 1960 and/or the mobile device cell reselection and/or access management module 1980, various aspects of communicating over (or managing communications over) a first radio frequency spectrum (e.g., a licensed radio frequency spectrum usable for LTE/LTE-A communications) and/or a second radio frequency spectrum (e.g., a shared access radio frequency spectrum usable for LTE/LTE-A communications).

The mobile device transceiver module(s) 1930 may include a modem configured to modulate packets and provide the modulated packets to the mobile device antenna(s) 1940 for transmission, and to demodulate packets received from the mobile device antenna(s) 1940. The mobile device transceiver module(s) 1930 may, in some examples, be implemented as one or more mobile device transmitter modules and one or more separate mobile device receiver modules. The mobile device transceiver module(s) 1930 may support communications in the first radio frequency spectrum and/or the second radio frequency spectrum. The mobile device transceiver module(s) 1930 may be configured to communicate bi-directionally, via the mobile device antenna(s) 1940, with one or more of the base stations 105, 205, 305, and/or 1805 described with reference to FIGS. 1, 2, 3, and/or 18, and/or one or more of the PCell 510, 610, 710, 810, 910, 1010, and/or 1110 described with reference to FIGS. 5, 6, 7, 8, 9, 10, and/or 11, and/or one or more of the NCell 520, 530, 640, 650, 920, 930, 1020, 1030, 1120, and/or 1130 described with reference to FIGS. 5, 6, 9, 10, and/or 11, and/or one or more of the SCell 620 and/or 630 described with reference to FIG. 6, and/or one or more of the apparatus 1205, 1305, and/or 1405 described with reference to FIGS. 12, 13, and/or 14. While the mobile device 1915 may include a single mobile device antenna, there may be examples in which the mobile device 1915 may include multiple mobile device antennas 1940.

The state module 1950 may be used, for example, to manage transitions of the mobile device 1915 between an RRC idle state and an RRC connected state, and may be in communication with other components of the mobile device 1915, directly or indirectly, over the one or more buses 1935. The state module 1950, or portions of it, may include a processor, and/or some or all of the functions of the state module 1950 may be performed by the mobile device processor module 1910 and/or in connection with the mobile device processor module 1910.

The mobile device wireless communication management module 1960 may be configured to perform and/or control some or all of the features and/or functions described with reference to FIGS. 1, 2, 3, 5, 6, 7, 8, 9, 10, 11, 12, 15, 16, and/or 17 related to wireless communication over the first radio frequency spectrum and/or the second radio frequency spectrum. For example, the mobile device wireless communication management module 1960 may be configured to support a supplemental downlink mode, a carrier aggregation mode, and/or a standalone mode of operation using the first radio frequency spectrum and/or the second radio frequency spectrum. The mobile device wireless communication management module 1960 may include a mobile device licensed spectrum LTE/LTE-A module 1965 configured to handle LTE/LTE-A communications in the first radio frequency spectrum, and a mobile device shared spectrum LTE/LTE-A module 1970 configured to handle LTE/LTE-A communications in the second radio frequency spectrum. The mobile device wireless communication management module 1960, or portions of it, may include a processor, and/or some or all of the functions of the mobile device wireless communication management module 1960 may be performed by the mobile device processor module 1910 and/or in connection with the mobile device processor module 1910.

The mobile device cell reselection and/or access management module 1980 may be configured to perform and/or control some or all of the features and/or functions described with reference to FIGS. 1, 2, 3, 5, 6, 7, 8, 9, 10, 11, 12, 15, 16, and/or 17 related to cell reselection and/or initial access of cells using the first radio frequency spectrum and/or the second radio frequency spectrum. In some examples, the mobile device cell reselection and/or access management module 1980 may be an example of one or more aspects of the cell reselection and/or access management module 1220, 1520, 1620, and/or 1720 described with reference to FIGS. 12, 15, 16, and/or 17. The mobile device cell reselection and/or access management module 1980, or portions of it, may include a processor, and/or some or all of the functions of the mobile device cell reselection and/or access management module 1980 may be performed by the mobile device processor module 1910 and/or in connection with the mobile device processor module 1910.

Figure 20:
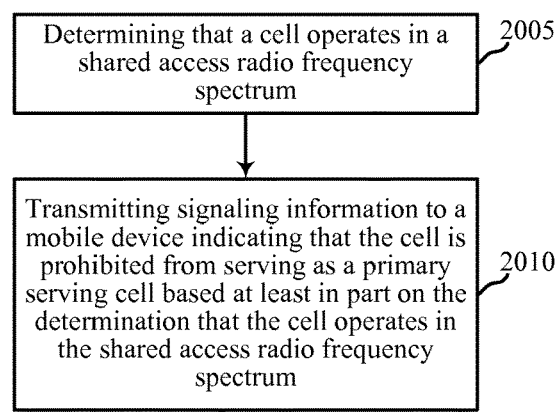
FIG. 20 is a flow chart illustrating an example of a method for wireless communication (e.g., by a base station or cell), in accordance with various aspects of the present disclosure.

FIG. 20 is a flow chart illustrating an example of a method 2000 for wireless communication (e.g., by a base station or cell), in accordance with various aspects of the present disclosure. For clarity, the method 2000 is described below with reference to aspects of one or more of the base station 105, 205, 305, and/or 1805 described with reference to FIGS. 1, 2, 3, and/or 18, and/or one or more aspects of the apparatus 1205, 1305, and/or 1405 described with reference to FIGS. 12, 13, and/or 14, which may operate the PCell 510, 610, 710, 810, 910, 1010, and/or 1110 described with reference to FIGS. 5, 6, 7, 8, 9, 10, and/or 11, and/or the NCell 520, 530, 640, 650, 920, 930, 1020, 1030, 1120, and/or 1130 described with reference to FIGS. 5, 6, 9, 10, and/or 11, and/or the SCell 620 and/or 630 described with reference to FIG. 6. In some examples, a base station and/or apparatus operating a PCell, SCell, and/or NCell may execute one or more sets of codes to control the functional elements of the base station, apparatus, PCell, SCell, and/or NCell to perform the functions described below.

At block 2005, the method 2000 may include determining that a cell operates in a shared access radio frequency spectrum (e.g., a radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). The operation(s) at block 2005 may be performed using the cell reselection and/or access management module 1220, 1320, 1420, and/or 1880 described with reference to FIGS. 12, 13, 14, and/or 18, and/or the cell type and/or frequency type determination module 1335 and/or 1435 described with reference to FIGS. 13 and/or 14.

At block 2010, the method 2000 may include transmitting signaling information to a mobile device indicating that the cell is prohibited from serving as a primary serving cell based at least in part on the determination that the cell operates in the shared access radio frequency spectrum. The operation(s) at block 2010 may be performed using the cell reselection and/or access management module 1220, 1320, 1420, and/or 1880 described with reference to FIGS. 12, 13, 14, and/or 18, and/or the cell type and/or frequency type notification module 1340 and/or 1440 described with reference to FIGS. 13 and/or 14.

When the mobile device is in an RRC connected state, the signaling information transmitted to the mobile device may include RRC signaling information. The RRC signaling information may include any of the signaling information transmitted by the PCell 710 and/or 810 described with reference to FIGS. 7 and/or 8.

When the mobile device is in an RRC idle state, the signaling information transmitted to the mobile device may include any of the signaling information transmitted by the NCell 920, 930, 1020, 1030, 1120, and/or 1130 described with reference to FIGS. 9, 10, and/or 11.

Thus, the method 2000 may provide for wireless communication. It should be noted that the method 2000 is just one implementation and that the operations of the method 2000 may be rearranged or otherwise modified such that other implementations are possible.

Figure 21:
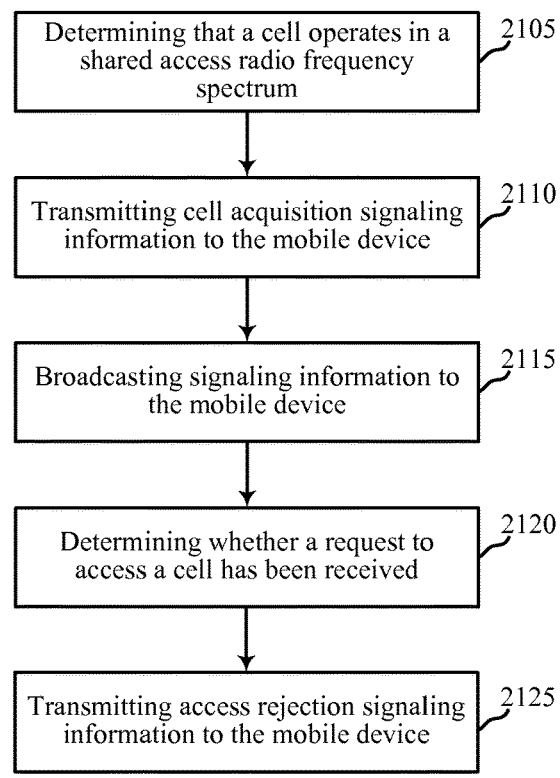
FIG. 21 is a flow chart illustrating an example of a method for wireless communication (e.g., by a base station or cell), in accordance with various aspects of the present disclosure.

FIG. 21 is a flow chart illustrating an example of a method 2100 for wireless communication (e.g., by a base station or cell), in accordance with various aspects of the present disclosure. For clarity, the method 2100 is described below with reference to aspects of one or more of the base station 105, 205, 305, and/or 1805 described with reference to FIGS. 1, 2, 3, and/or 18, and/or one or more aspects of the apparatus 1205, 1305, and/or 1405 described with reference to FIGS. 12, 13, and/or 14, which may operate the PCell 510, 610, 710, 810, 910, 1010, and/or 1110 described with reference to FIGS. 5, 6, 7, 8, 9, 10, and/or 11, and/or the NCell 520, 530, 640, 650, 920, 930, 1020, 1030, 1120, and/or 1130 described with reference to FIGS. 5, 6, 9, 10, and/or 11, and/or the SCell 620 and/or 630 described with reference to FIG. 6. In some examples, a base station and/or apparatus operating a PCell, SCell, and/or NCell may execute one or more sets of codes to control the functional elements of the base station, PCell, SCell, NCell, and/or apparatus to perform the functions described below.

At block 2105, the method 2100 may include determining that a cell operates in a shared access radio frequency spectrum (e.g., radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). The operation(s) at block 2005 may be performed using the cell reselection and/or access management module 1220, 1320, 1420, and/or 1880 described with reference to FIGS. 12, 13, 14, and/or 18, and/or the cell type and/or frequency type determination module 1335 and/or 1435 described with reference to FIGS. 13 and/or 14.

At block 2110, block 2115, and/or block 2125, the method 2100 may include determining whether to transmit signaling information to a mobile device indicating that the cell is prohibited from serving as a primary serving cell. The operation(s) at block 2110, 2115, and/or 2125 may be performed using the cell reselection and/or access management module 1220, 1320, 1420, and/or 1880 described with reference to FIGS. 12, 13, 14, and/or 18, and/or the cell type and/or frequency type notification module 1340 and/or 1440 described with reference to FIGS. 13 and/or 14.

More specifically, and at block 2110, the method 2100 may include transmitting cell acquisition signaling information to the mobile device. The cell acquisition signaling information transmitted to the mobile device at block 2110 may include any of the cell acquisition signaling information transmitted by the NCell 920 and/or 930 described with reference to FIG. 9.

At block 2115, the method 2100 may include broadcasting signaling information to the mobile device. The signaling information broadcast to the mobile device at block 2115 may include any of the broadcast signaling information broadcast by the NCell 1020 and/or 1030 described with reference to FIG. 10.

At block 2120, the method 2100 may include determining whether a request to access a cell has been received. When the request to access the cell has been received, the method may proceed to block 2125, where the method 2100 may include transmitting access rejection signaling information to the mobile device. The access rejection signaling information transmitted to the mobile device at block 2125 may include any of the access rejection signaling information broadcast by the NCell 1120 and/or 1130 described with reference to FIG. 11.

Thus, the method 2100 may provide for wireless communication. It should be noted that the method 2100 is just one implementation and that the operations of the method 2100 may be rearranged or otherwise modified such that other implementations are possible.

Figure 22:
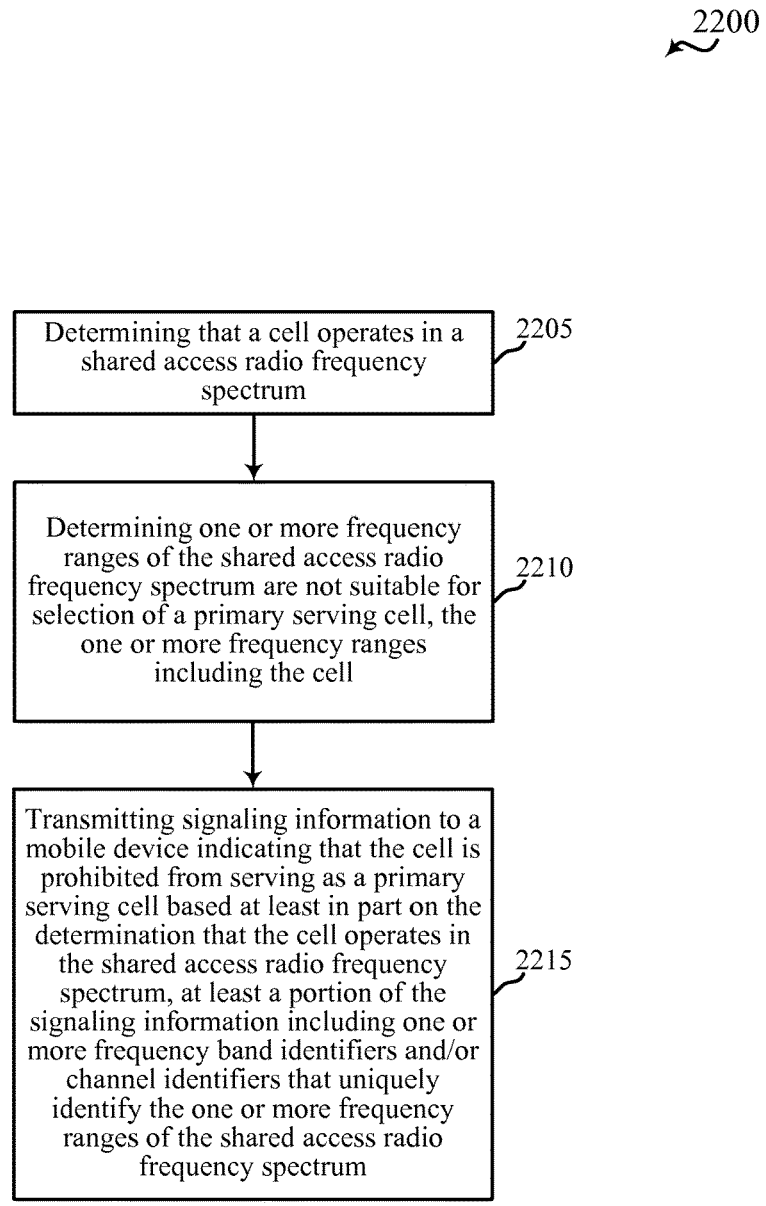
FIG. 22 is a flow chart illustrating an example of a method for wireless communication (e.g., by a base station or cell), in accordance with various aspects of the present disclosure.

FIG. 22 is a flow chart illustrating an example of a method 2200 for wireless communication (e.g., by a base station or cell), in accordance with various aspects of the present disclosure. For clarity, the method 2200 is described below with reference to aspects of one or more of the base station 105, 205, 305, and/or 1805 described with reference to FIGS. 1, 2, 3, and/or 18, and/or one or more aspects of the apparatus 1205, 1305, and/or 1405 described with reference to FIGS. 12, 13, and/or 14, which may operate the PCell 510, 610, 710, 810, 910, 1010, and/or 1110 described with reference to FIGS. 5, 6, 7, 8, 9, 10, and/or 11, and/or the NCell 520, 530, 640, 650, 920, 930, 1020, 1030, 1120, and/or 1130 described with reference to FIGS. 5, 6, 9, 10, and/or 11, and/or the SCell 620 and/or 630 described with reference to FIG. 6. In some examples, a base station and/or apparatus operating a PCell, SCell, and/or NCell may execute one or more sets of codes to control the functional elements of the base station, apparatus, PCell, SCell, and/or NCell to perform the functions described below.

At block 2205, the method 2200 may include determining that a cell operates in a shared access radio frequency spectrum (e.g., radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). The operation(s) at block 2205 may be performed using the cell reselection and/or access management module 1220, 1320, 1420, and/or 1880 described with reference to FIGS. 12, 13, 14, and/or 18, and/or the cell type and/or frequency type determination module 1335 and/or 1435 described with reference to FIGS. 13 and/or 14.

At block 2210, the method 2200 may include determining one or more frequency ranges of the shared access radio frequency spectrum are not suitable for selection of a primary serving cell. The one or more frequency ranges may include a frequency used by the cell that operates in the shared access radio frequency spectrum. The operation(s) at block 2210 may be performed using the cell reselection and/or access management module 1220, 1320, 1420, and/or 1880 described with reference to FIGS. 12, 13, 14, and/or 18, and/or the cell type and/or frequency type determination module 1335 and/or 1435 described with reference to FIGS. 13 and/or 14.

At block 2215, the method 2200 may include transmitting signaling information to a mobile device indicating that the cell is prohibited from serving as a primary serving cell based at least in part on the determination that the cell operates in the shared access radio frequency spectrum. At least a portion of the signaling information may include one or more frequency band identifiers and/or channel identifiers that uniquely identify the one or more frequency ranges of the shared access radio frequency spectrum. The operation(s) at block 2215 may be performed using the cell reselection and/or access management module 1220, 1320, 1420, and/or 1880 described with reference to FIGS. 12, 13, 14, and/or 18, the cell type and/or frequency type notification module 1340 and/or 1440 described with reference to FIGS. 13 and/or 14, and/or the unavailable cell/frequency notification module 1450 described with reference to FIG. 14.

Thus, the method 2200 may provide for wireless communication. It should be noted that the method 2200 is just one implementation and that the operations of the method 2200 may be rearranged or otherwise modified such that other implementations are possible.

Figure 23:
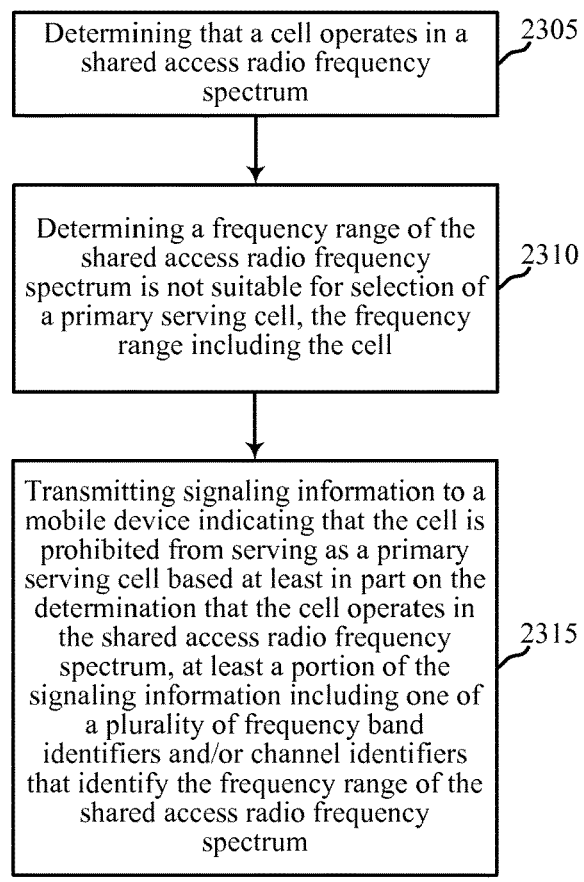
FIG. 23 is a flow chart illustrating an example of a method for wireless communication (e.g., by a base station or cell), in accordance with various aspects of the present disclosure.

FIG. 23 is a flow chart illustrating an example of a method 2300 for wireless communication (e.g., by a base station or cell), in accordance with various aspects of the present disclosure. For clarity, the method 2300 is described below with reference to aspects of one or more of the base station 105, 205, 305, and/or 1805 described with reference to FIGS. 1, 2, 3, and/or 18, and/or one or more aspects of the apparatus 1205, 1305, and/or 1405 described with reference to FIGS. 12, 13, and/or 14, which may operate the PCell 510, 610, 710, 810, 910, 1010, and/or 1110 described with reference to FIGS. 5, 6, 7, 8, 9, 10, and/or 11, and/or the NCell 520, 530, 640, 650, 920, 930, 1020, 1030, 1120, and/or 1130 described with reference to FIGS. 5, 6, 9, 10, and/or 11, and/or the SCell 620 and/or 630 described with reference to FIG. 6. In some examples, a base station and/or apparatus operating a PCell, SCell, and/or NCell may execute one or more sets of codes to control the functional elements of the base station, apparatus, PCell, SCell, and/or NCell to perform the functions described below.

At block 2305, the method 2300 may include determining that a cell operates in a shared access radio frequency spectrum (e.g., radio frequency spectrum for which apparatuses may need to contend for access because the radio frequency spectrum is available to unlicensed use, such as Wi-Fi radio frequency spectrum, and/or radio frequency spectrum which a plurality of MNOs are authorized to access). The operation(s) at block 2305 may be performed using the cell reselection and/or access management module 1220, 1320, 1420, and/or 1880 described with reference to FIGS. 12, 13, 14, and/or 18, and/or the cell type and/or frequency type determination module 1335 and/or 1435 described with reference to FIGS. 13 and/or 14.

At block 2310, the method 2300 may include determining a frequency range of the shared access radio frequency spectrum is not suitable for selection of a primary serving cell. The frequency range may include a frequency used by the cell that operates in the shared access radio frequency spectrum. The operation(s) at block 2310 may be performed using the cell reselection and/or access management module 1220, 1320, 1420, and/or 1880 described with reference to FIGS. 12, 13, 14, and/or 18, and/or the cell type and/or frequency type determination module 1335 and/or 1435 described with reference to FIGS. 13 and/or 14.

At block 2315, the method 2300 may include transmitting signaling information to a mobile device indicating that the cell is prohibited from serving as a primary serving cell based at least in part on the determination that the cell operates in the shared access radio frequency spectrum. At least a portion of the signaling information may include one of a plurality of frequency band identifiers and/or channel identifiers that identify the frequency range of the shared access radio frequency spectrum. The operation(s) at block 2315 may be performed using the cell reselection and/or access management module 1220, 1320, 1420, and/or 1880 described with reference to FIGS. 12, 13, 14, and/or 18, the cell type and/or frequency type notification module 1340 and/or 1440 described with reference to FIGS. 13 and/or 14, and/or the unavailable cell/frequency notification module 1450 and/or broadcast notification module 1460 described with reference to FIG. 14.

Thus, the method 2300 may provide for wireless communication. It should be noted that the method 2300 is just one implementation and that the operations of the method 2300 may be rearranged or otherwise modified such that other implementations are possible.

In some examples, one or more aspects of the methods 2000, 2100, 2200, and/or 2300 may be combined.

FIG. 24 is a flow chart illustrating an example of a method 2400 for wireless communication (e.g., by a mobile device), in accordance with various aspects of the present disclosure. For clarity, the method 2400 is described below with reference to aspects of one or more of the mobile device 115, 215, 215-*a*, 215-*b*, 315, 515, 615, 715, 815, 915, 1015, 1115, and/or 1915 described with reference to FIGS. 1, 2, 3, 5, 6, 7, 8, 9, 10, 11, and/or 19, and/or one or more aspects of the apparatus 1205 and/or 1505 described with reference to FIGS. 12 and/or 15. In some examples, a mobile device and/or apparatus may execute one or more sets of codes to control the functional elements of the mobile device and/or apparatus to perform the functions described below.

At block 2405, the method 2400 may include identifying, by a mobile device and/or apparatus, a cell operating in a shared access radio frequency spectrum is prohibited from serving as a primary serving cell based at least in part on information stored on the mobile device and/or apparatus. The operation(s) at block 2405 may be performed using the cell reselection and/or access management module 1220, 1520, and/or 1980 described with reference to FIGS. 12, 15, and/or 19, and/or the cell type and/or frequency type identification module 1535 described with reference to FIG. 15.

In some examples, the information stored on the mobile device may include the information stored on the mobile device 915, 1015, and/or 1115 described with reference to FIGS. 9, 10, and/or 11.

Thus, the method 2400 may provide for wireless communication. It should be noted that the method 2400 is just one implementation and that the operations of the method 2400 may be rearranged or otherwise modified such that other implementations are possible.

Figure 25:
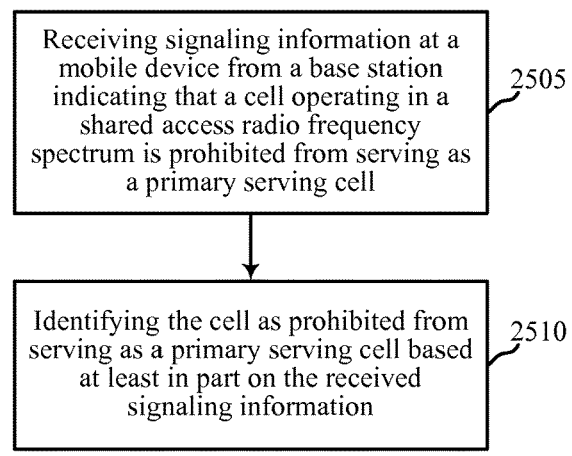
FIG. 25 is a flow chart illustrating an example of a method for wireless communication (e.g., by a mobile device), in accordance with various aspects of the present disclosure.

FIG. 25 is a flow chart illustrating an example of a method 2500 for wireless communication (e.g., by a mobile device), in accordance with various aspects of the present disclosure. For clarity, the method 2500 is described below with reference to aspects of one or more of the mobile device 115, 215, 215-*a*, 215-*b*, 315, 515, 615, 715, 815, 915, 1015, 1115, and/or 1915 described with reference to FIGS. 1, 2, 3, 5, 6, 7, 8, 9, 10, 11, and/or 19, and/or one or more aspects of the apparatus 1205, 1605, and/or 1705 described with reference to FIGS. 12, 16, and/or 17. In some examples, a mobile device and/or apparatus may execute one or more sets of codes to control the functional elements of the mobile device and/or apparatus to perform the functions described below.

At block 2505, the method 2500 may include receiving signaling information at a mobile device from a base station indicating that a cell operating in a shared access radio frequency spectrum is prohibited from serving as a primary serving cell. The operation(s) at block 2505 may be performed using the cell reselection and/or access management module 1220, 1620, 1720, and/or 1980 described with reference to FIGS. 12, 16, 17, and/or 19, and/or the cell type and/or frequency type reception module 1635 and/or 1735 described with reference to FIGS. 16 and/or 17.

In some examples, the signaling information received at the mobile device may include the information received at the mobile device 715, 815, 915, 1015, and/or 1115 described with reference to FIGS. 7, 8, 9, 10, and/or 11.

In some examples, the signaling information may be received via dedicated signaling resources and/or via RRC signaling.

At block 2510, the method 2500 may include identifying the cell as prohibited from serving as a primary serving cell based at least in part on the received signaling information. The operation(s) at block 2510 may be performed using the cell reselection and/or access management module 1220, 1620, 1720, and/or 1980 described with reference to FIGS. 12, 16, 17, and/or 19, and/or the cell type and/or frequency type identification module 1640 and/or 1740 described with reference to FIGS. 16 and/or 17.

In some examples of the method 2500, at least a portion of the signaling information may include one or more frequency band identifiers and/or channel identifiers that uniquely identify one or more frequency ranges of the shared access radio frequency spectrum. The one or more frequency ranges may include a frequency used by the cell identified as prohibited from serving as a primary cell. In these examples, the method 2500 may include determining the one or more frequency ranges of the shared access radio frequency spectrum are not suitable for selection of a primary serving cell, as described, for example, with reference to FIG. 10.

In some examples of the method 2500, at least a portion of the signaling information may include one of a plurality of frequency band identifiers and/or channel identifiers that identify a frequency range of the shared access radio frequency spectrum. The frequency range may include a frequency used by the cell identified as prohibited from serving as a primary cell. In these examples, the method 2500 may include determining the frequency range of the shared access radio frequency spectrum is not suitable for selection of a primary serving cell, as described, for example, with reference to FIGS. 9, 10, and/or 11.

Thus, the method 2500 may provide for wireless communication. It should be noted that the method 2500 is just one implementation and that the operations of the method 2500 may be rearranged or otherwise modified such that other implementations are possible.

In some examples, one or more aspects of the methods 2400 and/or 2500 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   determining, by a primary serving cell, that a neighbor cell operates in a shared access radio frequency spectrum;
   determining one or more frequency ranges of the shared access radio frequency spectrum are not suitable for selection as a primary serving cell, the one or more frequency ranges including a frequency used by the neighbor cell; and
   transmitting, by the primary serving cell, signaling information to a mobile device indicating that the neighbor cell is prohibited from serving as a primary serving cell based at least in part on the determination that the neighbor cell operates in the shared access radio frequency spectrum, wherein the primary serving cell is associated with a first base station and the neighbor cell is associated with a second base station, and wherein at least a portion of the signaling information comprises one or more frequency band identifiers or channel identifiers that identify the one or more frequency ranges of the shared access radio frequency spectrum.

2. The method of claim 1, wherein transmitting the signaling information comprises:
   transmitting the signaling information using dedicated signaling resources.

3. The method of claim 2, wherein the signaling information comprises radio resource control (RRC) signaling information.

4. The method of claim 3, wherein the signaling information indicates one or more frequencies of the shared access radio frequency spectrum that the mobile device should not monitor when the mobile device is in a radio resource control (RRC) idle state.

5. The method of claim 1, wherein one or more frequencies of the shared access radio frequency spectrum are not assigned a cell reselection priority.

6. The method of claim 1, wherein transmitting the signaling information comprises:
   broadcasting the signaling information.

7. The method of claim 1, wherein the signaling information indicates that the mobile device is prohibited from accessing the neighbor cell as a primary serving cell for a time period.

8. The method of claim 1, wherein transmitting the signaling information comprises:
   transmitting the signaling information using a primary synchronization signal (PSS), a secondary synchronization signal (SSS), or a cell reference signal (CRS).

9. The method of claim 1, wherein transmitting the signaling information comprises:
   transmitting the signaling information using a clear channel assessment (CCA) exempt transmission (CET) frame.

10. The method of claim 1, wherein the signaling information is transmitted in a master information block (MIB).

11. The method of claim 10, wherein the signaling information is transmitted using one or more information elements added to the MIB.

12. The method of claim 1, wherein the signaling information is transmitted in a system information block (SIB).

13. The method of claim 12, wherein the signaling information is transmitted using one or more information elements added to the SIB.

14. The method of claim 12, wherein a frequency band identifier is used to indicate that the neighbor cell is prohibited from serving as a primary serving cell.

15. The method of claim 1, further comprising:
   preventing a handover of the mobile device to the neighbor cell based at least in part on the determination that the neighbor cell operates in the shared access radio frequency spectrum when the mobile device is in a radio resource control (RRC) connected state.

16. The method of claim 1, wherein the signaling information indicates one or more frequencies of the shared access radio frequency spectrum that are unavailable for cell reselection consideration when the mobile device is in a radio resource control (RRC) idle state.

17. The method of claim 1, further comprising:
   receiving a request from the mobile device to access the neighbor cell that operates in the shared access radio frequency spectrum; and
   rejecting the request to access the neighbor cell that operates in the shared access radio frequency spectrum, wherein the transmitting the signaling information comprises transmitting a cause value to the mobile device indicating that the neighbor cell is prohibited from serving as the primary serving cell.

18. The method of claim 1, wherein determining one or more frequency ranges of the shared access radio frequency spectrum are not suitable for selection as a primary serving cell further comprises:
   determining that the one or more frequency ranges of the shared access radio frequency spectrum are less reliable than other frequency ranges of the shared access radio frequency spectrum for handling control signals.

19. An apparatus for wireless communication, comprising:
   a processor;
   memory in electronic communication with the processor; and
   instructions stored in the memory, the instructions being executable by the processor to:
   identify a current cell associated with a first base station;
   determine that a neighbor cell associated with a second base station operates in a shared access radio frequency spectrum;
   determine one or more frequency ranges of the shared access radio frequency spectrum are not suitable for selection of a primary serving cell, the one or more frequency ranges including a frequency used by the neighbor cell; and
   transmit signaling information to a mobile device indicating that the neighbor cell is prohibited from serving as a primary serving cell based at least in part on the determination that the neighbor cell operates in the shared access radio frequency spectrum, wherein at least a portion of the signaling information comprises one or more frequency band identifiers or channel identifiers that identify the one or more frequency ranges of the shared access radio frequency spectrum.

20. The apparatus of claim 19, wherein the instructions executable by the processor to determine one or more frequency ranges of the shared access radio frequency spectrum are not suitable for selection as a primary serving cell are further executable by the processor to:
   determine that the one or more frequency ranges of the shared access radio frequency spectrum are less reliable than other frequency ranges of the shared access radio frequency spectrum for handling control signals.

21. A method for wireless communication, comprising:
receiving signaling information at a mobile device from a first base station indicating that a neighbor cell associated with a second base station is operating in a shared access radio frequency spectrum and is prohibited from serving as a primary serving cell, wherein at least a portion of the signaling information comprises one or more frequency band identifiers or channel identifiers that identify one or more frequency ranges of the shared access radio frequency spectrum, the one or more frequency ranges including a frequency used by the neighbor cell;
determining the one or more frequency ranges of the shared access radio frequency spectrum are not suitable for selection of a primary serving cell; and
identifying the neighbor cell as prohibited from serving as the primary serving cell based at least in part on the received signaling information.

22. The method of claim 21, wherein the signaling information is received via dedicated signaling resources.

23. The method of claim 22, wherein the signaling information is received via radio resource control (RRC) signaling.

24. The method of claim 23, wherein the signaling information indicates one or more frequencies of the shared access radio frequency spectrum that the mobile device should not monitor when the mobile device is in a radio resource control (RRC) idle state.

25. The method of claim 21, wherein the signaling information indicates that the mobile device is prohibited from accessing the neighbor cell as a primary serving cell for a time period.

26. The method of claim 21, wherein the signaling information indicates one or more frequencies of the shared access radio frequency spectrum that are unavailable for cell reselection consideration when the mobile device is in a radio resource control (RRC) idle state.

27. The method of claim 21, wherein determining the one or more frequency ranges of the shared access radio frequency spectrum are not suitable for selection as a primary serving cell further comprises:
determining that the one or more frequency ranges of the shared access radio frequency spectrum are less reliable than other frequency ranges of the shared access radio frequency spectrum for handling control signals.

28. An apparatus for wireless communication, comprising:
a processor;
memory in electronic communication with the processor; and
instructions stored in the memory, the instructions being executable by the processor to:
receive signaling information at a mobile device from a first base station indicating that a neighbor cell associated with a second base station is operating in a shared access radio frequency spectrum and is prohibited from serving as a primary serving cell, wherein at least a portion of the signaling information comprises one or more frequency band identifiers or channel identifiers that identify one or more frequency ranges of the shared access radio frequency spectrum, the one or more frequency ranges including a frequency used by the neighbor cell;
determine the one or more frequency ranges of the shared access radio frequency spectrum are not suitable for selection of a primary serving cell; and
identify the neighbor cell as prohibited from serving as a primary serving cell based at least in part on the received signaling information.

29. The apparatus of claim 28, wherein the instructions executable by the processor to determine one or more frequency ranges of the shared access radio frequency spectrum are not suitable for selection as a primary serving cell are further executable by the processor to:
determine that the one or more frequency ranges of the shared access radio frequency spectrum are less reliable than other frequency ranges of the shared access radio frequency spectrum for handling control signals.

* * * * *